(12) United States Patent
Vasilescu et al.

(10) Patent No.: US 7,379,925 B2
(45) Date of Patent: *May 27, 2008

(54) LOGIC ARRANGEMENT, DATA STRUCTURE, SYSTEM AND METHOD FOR MULTILINEAR REPRESENTATION OF MULTIMODAL DATA ENSEMBLES FOR SYNTHESIS, ROTATION AND COMPRESSION

(75) Inventors: Manuela Alex O. Vasilescu, Seaford, NY (US); Demetri Terzopoulos, New York, NY (US)

(73) Assignee: New York University, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/200,479

(22) Filed: Aug. 8, 2005

(65) Prior Publication Data

US 2006/0143142 A1    Jun. 29, 2006

Related U.S. Application Data

(63) Continuation-in-part of application No. PCT/US04/24000, filed on Jul. 26, 2004.
(60) Provisional application No. 60/600,214, filed on Aug. 6, 2004, provisional application No. 60/490,131, filed on Jul. 25, 2003.

(51) Int. Cl.
*G06E 1/00* (2006.01)
*G06E 3/00* (2006.01)
*G06F 15/18* (2006.01)
*G06G 7/00* (2006.01)

(52) U.S. Cl. .................................................. 706/20
(58) Field of Classification Search .................... 706/1, 706/20; 707/100
See application file for complete search history.

(56) References Cited

U.S. PATENT DOCUMENTS

| 5,170,455 | A | * | 12/1992 | Goossen et al. | 385/89 |
| 5,301,350 | A | * | 4/1994 | Rogan et al. | 705/33 |
| 5,321,816 | A | * | 6/1994 | Rogan et al. | 705/42 |
| 5,347,653 | A | * | 9/1994 | Flynn et al. | 707/203 |
| 5,428,731 | A | * | 6/1995 | Powers, III | 715/501.1 |
| 5,493,682 | A |   | 2/1996 | Tyra et al. | |
| 5,560,003 | A | * | 9/1996 | Nilsen et al. | 707/206 |
| 5,692,185 | A | * | 11/1997 | Nilsen et al. | 707/104.1 |
| 5,717,919 | A | * | 2/1998 | Kodavalla et al. | 707/8 |
| 5,740,425 | A | * | 4/1998 | Povilus | 707/100 |
| 5,784,294 | A | * | 7/1998 | Platt et al. | 702/27 |

(Continued)

OTHER PUBLICATIONS

Multilinear independent components analysis Vasilescu, M.A.O.; Terzopoulos, D.; Computer Vision and Pattern Recognition, 2005. CVPR 2005. IEEE Computer Society Conference on vol. 1, Jun. 20-25, 2005 pp. 547-553 vol. 1.*

(Continued)

*Primary Examiner*—Michael B. Holmes
(74) *Attorney, Agent, or Firm*—Dorsey & Whitney LLP

(57) ABSTRACT

A data structure, method, storage medium and logic arrangement are provided for use in collecting and analyzing multilinear data describing various characteristics of different objects. In particular it is possible to recognize an unknown object or an unknown viewpoint of an object, as well as synthesize a known viewpoint never before recorded of an object, and reduce the amount of stored data describing an object or viewpoint by using dimensionality reduction techniques, and the like.

27 Claims, 29 Drawing Sheets

U.S. PATENT DOCUMENTS

| | | | |
|---|---|---|---|
| 5,794,256 A | | 8/1998 | Bennett et al. |
| 5,799,312 A | * | 8/1998 | Rigoutsos ............... 707/103 R |
| 5,802,525 A | * | 9/1998 | Rigoutsos ............... 707/103 R |
| 5,845,285 A | * | 12/1998 | Klein .......................... 707/101 |
| 5,852,740 A | * | 12/1998 | Estes ........................... 712/15 |
| 5,870,749 A | | 2/1999 | Adusumilli |
| 5,884,056 A | * | 3/1999 | Steele ........................ 715/738 |
| 5,890,152 A | * | 3/1999 | Rapaport et al. .............. 707/6 |
| 5,974,416 A | * | 10/1999 | Anand et al. .................. 707/10 |
| 5,974,418 A | * | 10/1999 | Blinn et al. .................. 707/100 |
| 5,995,999 A | * | 11/1999 | Bharadhwaj ................ 709/200 |
| 6,003,038 A | * | 12/1999 | Chen ....................... 707/103 R |
| 6,029,169 A | | 2/2000 | Jenkins |
| 6,105,041 A | | 8/2000 | Bennett et al. |
| 6,208,992 B1 | * | 3/2001 | Bruckner .................... 707/100 |
| 6,349,265 B1 | * | 2/2002 | Pitman et al. ................ 702/27 |
| 6,381,507 B1 | | 4/2002 | Shima et al. |
| 6,404,743 B1 | * | 6/2002 | Meandzija ................... 370/254 |
| 6,408,321 B1 | * | 6/2002 | Platt ........................... 708/520 |
| 6,470,360 B1 | * | 10/2002 | Vaitheeswaran ............ 707/205 |
| 6,510,433 B1 | * | 1/2003 | Sharp et al. ................. 707/100 |
| 6,535,919 B1 | * | 3/2003 | Inoue et al. ................. 709/229 |
| 6,549,943 B1 | | 4/2003 | Spring |
| 6,591,004 B1 | * | 7/2003 | VanEssen et al. ........... 382/154 |
| 6,631,364 B1 | * | 10/2003 | Rioux et al. .................... 707/2 |
| 6,631,403 B1 | * | 10/2003 | Deutsch et al. ............. 709/217 |
| 6,691,096 B1 | * | 2/2004 | Staats ............................. 707/1 |
| 6,721,454 B1 | * | 4/2004 | Qian et al. ................... 382/224 |
| 6,724,931 B1 | * | 4/2004 | Hsu ............................ 382/155 |
| 6,732,124 B1 | * | 5/2004 | Koseki et al. ............... 707/202 |
| 6,738,356 B1 | * | 5/2004 | Russell et al. ............... 370/260 |
| 6,741,744 B1 | * | 5/2004 | Hsu ............................ 382/229 |
| 6,789,128 B1 | * | 9/2004 | Harrison et al. ............ 709/246 |
| 7,085,426 B2 | * | 8/2006 | August ........................ 382/260 |
| 7,130,484 B2 | * | 10/2006 | August ........................ 382/266 |

OTHER PUBLICATIONS

Model-based and image-based methods for facial image synthesis, analysis and recognition Terzopoulos, D.; Yuencheng Lee; Vasilescu, M.A.O.; Automatic Face and Gesture Recognition, 2004. Proceedings. Sixth IEEE International Conference on May 17-19, 2004 pp. 3-8.*

Multilinear subspace analysis of image ensembles Vasilescu, M.A.O.; Terzopoulos, D.; Computer Vision and Pattern Recognition, 2003. Proceedings. 2003 IEEE Computer Society Conference on vol. 2, Jun. 18-20, 2003 pp. II-93-99 vol. 2.*

Human motion signatures: analysis, synthesis, recognition Vasilescu, M.A.O.; Pattern Recognition, 2002. Proceedings. 16th International Conference on vol. 3, Aug. 11-15, 2002 pp. 456-460 vol. 3.*

Multilinear image analysis for facial recognition Vasilescu, M.A.O.; Terzopoulos, D.; Pattern Recognition, 2002. Proceedings. 16th International Conference on vol. 2, Aug. 11-15, 2002 pp. 511-514 vol. 2.*

Sampling and reconstruction with adaptive meshes Terzopoulos, D.; Vasilescu, M.; Computer Vision and Pattern Recognition, 1991. Proceedings CVPR '91., IEEE Computer Society Conference on Jun. 3-6, 1991 pp. 70-75.*

Adaptive meshes and shells: irregular triangulation, discontinuities, and hierarchical subdivision Vasilescu, M.; Terzopoulos, D.;Computer Vision and Pattern Recognition, 1992. Proceedings CVPR '92., 1992 IEEE Computer Society Conference on Jun. 15-18, 1992 pp. 829-832.*

On image analysis by moments Liao, S.X.; Pawlak, M.; Pattern Analysis and Machine Intelligence, IEEE Transactions on vol. 18, Issue 3, Mar. 1996 pp. 254-266 Digital Object Identifier 10.1109/34.485554.*

Automatic interpretation of sonar image sequences using temporal feature measures Chantler, M.J.; Stoner, J.P.; Oceanic Engineering, IEEE Journal of vol. 22, Issue 1, Jan. 1997 pp. 47-56 Digital Object Identifier 10.1109/48.557539.*

Knowledge-based signal understanding Glover, J.R.; Jansen, B.H.; Dawant, B.M.; Raghavan, N.; Ktonas, P.Y.; Circuits and Systems, 1988., IEEE International Symposium on Jun. 7-9, 1988 pp. 2367-2370 vol. 3 Digital Object Identifier 10.1109/ISCAS.1988.15419.*

A Knowledge-based system for recognizing man-made objects in aerial images Smyrniotis, C.; Dutta, K.; Computer Vision and Pattern Recognition, 1988. Proceedings CVPR '88., Computer Society Conference on Jun. 5-9, 1988 pp. 111-117 Digital Object Identifier 10.1109/CVPR.1988.196223.*

The scalability of an object descriptor architecture OODBMS Yu, K.K.; Lee, B.S.; Olson, M.R.; Database Engineering and Applications, 1999. IDEAS '99. International Symposium Proceedings Aug. 2-4, 1999 pp. 370-377 Digital Object Identifier 10.1109/IDEAS.1999.787287.*

MPEG-4 systems: architecting object-based audio-visual content Eleftheriadis, A.; Multimedia Signal Processing, 1998 IEEE Second Workshop on Dec. 7-9, 1998 pp. 535-540 Digital Object Identifier 10.1109/MMSP.1998.739036.*

Optimizer and parallel engine extensions for handling expensive methods based on large objects O'Connell, W.; Carino, F.; Linderman, G.; Data Engineering, 1999. Proceedings., 15th International Conference on Mar. 23-26, 1999 pp. 304-313 Digital Object Identifier 10.1109/ICDE.1999.754946.*

WHERE and WHAT: object perception for autonomous robots Kelly, M.F.; Levine, M.D.; Robotics and Automation, 1995. Proceedings., 1995 IEEE International Conference on vol. 1, May 21-27, 1995 pp. 261-267 vol. 1 Digital Object Identifier 10.1109/ROBOT.1995.525295.*

Succi et al., "A Taxonomy for Identifying a Software Component from Uncertain and Partial Specifications," ACM, Symposium on Applied Computing, pp. 570-579, 1996.

Colnet et al., "Compiler Support to Customize the Mark and Sweep Algorithm," ACM, International Symposium on Memory Management, pp. 154-165, 1998.

Baruchelli et al., "A Fuzzy Approach to Faceted Classification and Retrieval of Reusable Software Components," ACM, SIGAPP Applied Computing Review, vol. 5, Issue 1, pp. 15-20, Spring 1997.

Hassen et al., "A Flexible Operation Execution Model for Shared Distributed Objects," ACM, Conference on Object Oriented Programming Systems Language and Applications, pp. 30-50, 1996.

O'Connell et al., "Optimizer and Parallel Engine Extensions for Handling Expensive Methods Based on Large Objects, Data Engineering," IEEE, Proceeding 15th International Conference, pp. 304-313, 1999.

* cited by examiner

1200

1210

1220

1250

1260

1270

US 7,379,925 B2

LOGIC ARRANGEMENT, DATA STRUCTURE, SYSTEM AND METHOD FOR MULTILINEAR REPRESENTATION OF MULTIMODAL DATA ENSEMBLES FOR SYNTHESIS, ROTATION AND COMPRESSION

CROSS REFERENCE TO RELATED APPLICATIONS

This application is a continuation-in-part application of International Application PCT/US04/24000 filed Jul. 26, 2004, which claims priority from U.S. patent application Ser. No. 60/490,131 filed Jul. 25, 2003. This application also claims priority from U.S. patent application Ser. No. 60/600, 214 filed Aug. 6, 2004. This application also relates to U.S. patent application Ser. No. 60/337,912, 60/383,300 and International Application No. PCT/US02/39257. The entire disclosures of each of these applications are incorporated herein by reference.

FIELD OF THE INVENTION

The present invention relates generally to a logic arrangement, data structure, system and method for acquiring and manipulating data, and more particularly to a logic arrangement, data structure, system and method for acquiring and manipulating data describing the surface appearance of an object using at least one characteristic of the object, synthesizing new data, rotating an image of the object and reducing the amount of data describing one or more characteristics of the object (e.g., a group of coins or an ear of corn).

BACKGROUND OF THE INVENTION

Natural images are the composite consequence of multiple factors related to scene structure, illumination and imaging. Human perception of natural images remains robust despite significant variation of these factors. For example, people possess a remarkable ability to recognize faces given a broad variety of facial geometries, viewpoints, head poses and lighting conditions.

Some past facial recognition systems have been developed with the aid of linear models such as principal component analysis ("PCA"), independent component analysis ("ICA"). Principal components analysis ("PCA") is a popular linear technique that has been used in past facial image recognition systems and processes. By their very nature, linear models work best when a single-factor varies in an image formation. Thus, linear techniques for facial recognition systems perform adequately when person identity is the only factor permitted to change. However, if other factors (such as lighting, viewpoint, and viewpointsion) are also permitted to modify facial images, the recognition rate of linear facial recognition systems can fall dramatically.

Similarly, human motion is the composite consequence of multiple elements, including the action performed and a motion signature that captures the distinctive pattern of movement of a particular individual. Human recognition of particular characteristics of such movement can be robust even when these factors greatly vary. In the 1960's, the psychologist Gunnar Kohansson performed a series of experiments in which lights were attached to people's limbs, and recorded a video of the people performing different activities (e.g., walking, running and dancing). Observers of these moving light videos in which only the lights are visible were asked to classify the activity performed, and to note certain characteristics of the movements, such as a limp or an energetic/tired walk. It was observed that this task can be performed with ease, and that the observer could sometimes determine even recognize specific individuals in this manner. This may corroborate the idea that the motion signature is a perceptible element of human motion, and that the signature of a motion is a tangible quantity that can be separated from the actual motion type.

Further, the appearance of rendered surfaces in a computer-generated image may be determined by a complex interaction of multiple factors related to scene geometry, illumination, and imaging. For example, the bidirectional reflectance distribution function ("BRDF") may account for surface microstructure at a point. One generalization of the BRDF, namely the bidirectional texture function or BTF may capture the appearance of extended, textured surfaces. The BTF may accommodate spatially varying reflectance, surface mesostructure (i.e., three-dimensional texture caused by local height variation over rough surfaces), subsurface scattering, and other phenomena over a finite region of the surface. It is typically a function of six variables (x, y, $\theta_v$, $\phi_v$, $\theta_i$, $\phi_i$), where (x, y) are surface parametric (texel) coordinates, ($\theta_v$, $\phi_v$) are a view direction and ($\theta_i$, $\phi_i$) describe the illumination direction (a.k.a. the photometric angles). Several BTF acquisition devices are known to those of ordinary skill in the art. In essence, such devices may sample the BTF by acquiring images of a surface of interest from several different viewpoints under several different illuminations. Given only sparsely sampled BTF data, image-based rendering (IBR) may be applicable to the challenging problem of rendering the appearance of a textured surface viewed from an arbitrary vantage point under arbitrary illumination. This problem has recently attracted considerable attention.

However, there is a need to overcome at least some of the deficiencies of the prior art techniques.

OBJECTS AND SUMMARY OF THE INVENTION

Such need is addressed by the present invention. One of the objects of the present invention is to provide a logic arrangement, data structure, storage medium, system and method for generating an object descriptor. According to an exemplary embodiment of the present invention such storage medium may store a software program that is adapted for generating an object descriptor of at least one object. The software program, when executed by a processing arrangement, can be configured to cause the processing arrangement to execute at least the following operations: collecting a plurality of first data elements which contain information regarding at least one characteristic of the at least one object. The software program can also obtain the object descriptor based on the information of the first data. The object descriptor is related to the at least one characteristic and a further characteristic of the object. A plurality of second data elements which contain information regarding the further characteristic of the at least one object may be generated based on the object descriptor, and is one of an identity of an object, a viewpoint, an illumination, and a pixel.

In another exemplary embodiment of the present invention, a storage medium may include a software program for identifying a sample object based upon a sample object descriptor. The software program, when executed by a processing arrangement, may cause the processing arrangement to execute at least the operation of collecting a plurality of data elements which are defined by at least two primitives. The software program (or processing arrangement) may further obtain at least one of a plurality of object descriptors based on the information of the data elements, and may also compare the sample object descriptor to at least one of the object descriptors to determine whether the sample object descriptor is identifiable as one of the object descriptors. Each of the object descriptors may associated with a respective one of a plurality of objects, and the sample object may be one of an identity of an object, a viewpoint, an illumination, and a pixel.

In still another exemplary embodiment of the present invention, a storage medium may store a software program adapted for reducing a dimensionality of one of at least two object descriptors is provided. The software program, when executed by a processing arrangement, may cause the processing arrangement to execute at least the operation of collecting a plurality of data elements which are defined by at least two primitives, and obtain the one of the object descriptors based on the information of the data elements. The program or arrangement may also be adapted to reduce the dimensionality of the one of the object descriptors, wherein each of the object descriptors except for the one of the object descriptors having the reduced dimensionality maintain full dimensionality. The one of the object descriptors may be one of an identity of an object, a viewpoint, an illumination, and a pixel.

In a further exemplary embodiment of the present invention, a storage medium may store a software program adapted for generating an object descriptor. The software program, when executed by a processing arrangement, may cause the processing arrangement to execute at least the operation of includes a plurality of data elements which are defined by at least two primitives. The information related to the data elements is capable of being used to obtain the object descriptor using an orthonormal decomposition procedure. The object descriptor is one of an identity of an object, a viewpoint, an illumination, and a pixel.

Another exemplary embodiment of the present invention includes a tensor framework for image-based rendering. In particular, the embodiment may learn a parsimonious model of a bidirectional texture function (BTF) from observational data. Such learning may be accomplished, for example, through a "TensorTextures" operation. Given an ensemble of images of a textured surface, the embodiment may comprise and/or generate a nonlinear, generative model explicitly representing the multifactor interaction implicit in the detailed appearance of the surface under varying photometric angles, including local (per-texel) reflectance, complex mesostructural self-occlusion, interreflection and self-shadowing, and other BTF-relevant phenomena. Mathematically, the TensorTextures operation may be based on multilinear algebra (i.e., the algebra of higher-order tensors). It may be computed through a decomposition known as the N-mode singular value decomposition (SVD), an extension to tensors of a matrix singular value decomposition. This exemplary embodiment, as well as the TensorTextures operation, may be applied to the image-based rendering of natural and synthetic textured surfaces under continuously varying viewpoint and illumination conditions, as well as other image-based operations.

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1:
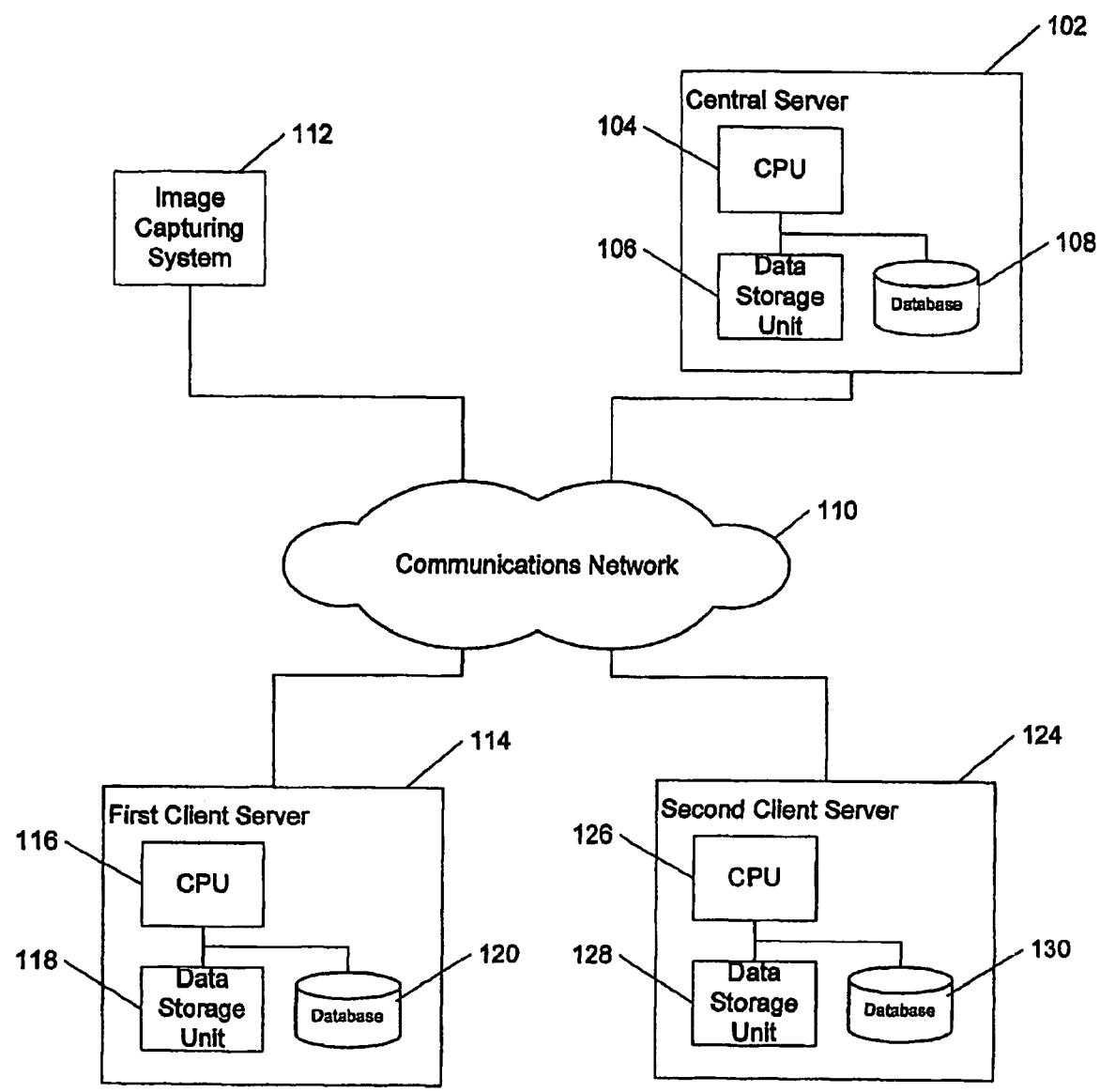
FIG. 1 is a block diagram of a data analysis system according to an exemplary embodiment of the present invention.

Throughout the figures, the same reference numerals and characters, unless otherwise stated, are used to denote like features, elements, components or portions of the illustrated embodiments. Moreover, while the present invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

FIG. 1 illustrates an exemplary embodiment of a data analysis system 100 for use in the collection and analysis of data describing various characteristics of different objects. In this embodiment, a central server 102 is provided in the system 100, which provides therein a central processing unit ("CPU") 104, a data storage unit 106 and a database 108. The central server 102 is connected to a communications network 110, which is in turn connected to an data capturing system 112. The data capturing system 112 can include at least one camera (not shown for the sake of clarity). A first client server 114 is provided in the system 100, which provides therein a CPU 116, a data storage unit 118, and a database 120. The first client server 114 is connected to the communications network 110. A second client server 124 is also provided in the system 100, which situates a CPU 126, a data storage unit 128, and a database 130. The second client server 124 is also connected to the communications network 110. It should be understood that the central server 102, the image capture system 112, the first client server 114 and the second client server 124 can forward data messages to each other over the communications network 110.

In a preferred embodiment of the present invention, the data capturing system 112 can be a "VICON" system which employs at least four video cameras. The VICON system can be used to capture human limb motion and the like.

A multilinear data analysis application can be stored in the data storage unit 106 of the central server 102. This multilinear data analysis application is capable of recognizing an unknown object, an unknown viewpoint of an object, an unknown illumination, an unknown viewpoint, and the like. Such application can also synthesize a known viewponit that has never before been recorded of an object, as well as an illumination which has previously not been recorded of an object. Further the application can reduce the amount of stored data that describes an object or viewpoint by using dimensionality reduction techniques, and the like. It should be understood that dimensionality reduction is equivalent to compression and data reduction. The multilinear data analysis application preferably utilizes a corpus of data, which is collected using the data capturing system 112 from different objects. The corpus of data is stored in the database 108 of the server 102, and can be organized as a tensor D, which shall be described in further detail as follows.

A tensor, also known as an n-way array or multidimensional matrix or n-mode matrix, is a higher order generalization of a vector (first order tensor) and a matrix (second order tensor). A tensor can be defined as a multi-linear mapping over a set of vector spaces. The tensor can be represented in the following manner: $A \in \mathbb{R}^{I_1 \times I_2 \times \cdots \times I_N}$ where A is a tensor. The order of the tensor A is N. A tensor is formed by a group of primitives. Each primitive is a set of mode vectors, such that a first primitive is a set of mode-1 vectors, a second vector is a set of mode-2 vectors, an $n^{th}$ primitive is a set of mode-n vectors, etc. In an alternate embodiment, the primitives can be row vectors of a matrix, column vectors of a matrix, index of a vector, etc. An element of tensor A is denoted as $A_{i_1 \ldots i_n \ldots i_N}$ or $a_{i_1 \ldots i_n \ldots i_N}$ or where $1 \leq i_n \leq I_n$. Scalars are denoted by lower case letters (a, b, . . . ), vectors by bold lower case letters (a, b . . . ), matrices by bold upper-case letters (A, B . . . ), and higher-order tensors by italicized bolded upper-case letters (A, B . . . ).

In tensor terminology, column vectors are referred to as mode-1 vectors, and row vectors are referred to as mode-2 vectors. Mode-n vectors of an $N^{th}$ order tensor $A \in \mathbb{R}^{I_1 \times I_2 \times \cdots \times I_N}$ are the $I_n$-dimensional vectors obtained from the tensor A by varying index $i_n$ while maintaining the other indices as fixed. The mode-n vectors are the column vectors of matrix $A_{(n)} \in \mathbb{R}^{I_n \times (I_1 I_2 \ldots I_{n-1} I_{n+1} \ldots I_N)}$ that can result from flattening the tensor A, as shown in FIGS. 12A-12F. The flattening procedure shall be described in further detail below. The n-rank of tensor $A \in \mathbb{R}^{I_1 \times I_2 \times \cdots \times I_N}$, denoted $R_n$, is defined as the dimension of the vector space generated by the mode-n vectors:

$$R_n = \text{rank}_n(A) = \text{rank}(A_{(n)}).$$

Figure 12A:
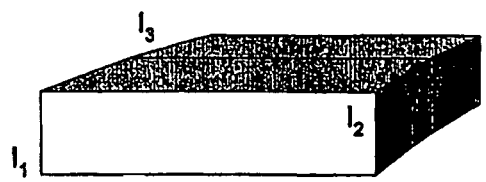
FIGS. 12A-12F are block diagrams of sample tensors and equivalent mode-1, mode-2 and mode-3 flattened tensors according to an exemplary embodiment of the present invention.
Figure 12B:
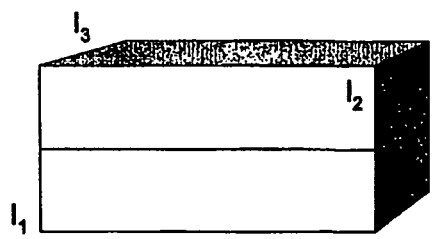
Figure 12C:
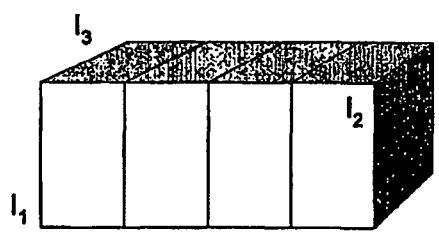
Figure 12D:
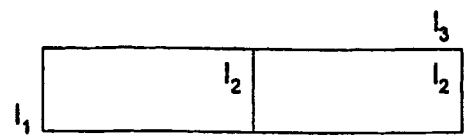
Figure 12E:
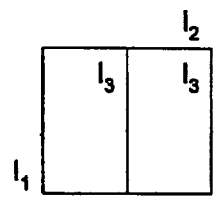
Figure 12F:
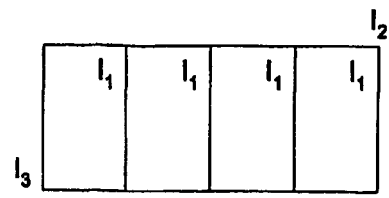

FIGS. 12A-12C show third order tensors 1200, 1210, 1220, respectively, each having dimensions $I_1 \times I_2 \times I_3$. FIG. 12D shows the third order tensor 1200 after having been mode-1 flattened to obtain a matrix 1250 containing mode-1 vectors of the third order tensor 1200. The third order tensor 1200 of FIG. 12A is a cube type structure, while the matrix 1250 is a two dimensional type structure having one index, i.e., $I_2$, imbedded (to a certain degree) within the matrix 1250. FIG. 12E shows a matrix 1260 containing mode-2 vectors of the third order tensor 1210 after it has been mode-2 flattened. This third order tensor 1210 is a cube type structure, while the matrix 1260 is a two dimensional type structure having one index, e.g., $I_3$, imbedded (to a certain degree) with the data. FIG. 12F shows the third order tensor 1220 after having been mode-3 flattened to obtain a matrix 1270 containing mode-3 vectors of the third order tensor 1220. Such third order tensor 1220 is a cube type structure, while the matrix 1270 organizes is a two dimensional type structure having one index, e.g., $I_1$, imbedded (to a certain degree) with the data.

A generalization of the product of two matrices can be the product of the tensor and matrix. The mode-n product of tensor $A \in \mathbb{R}^{I_1 \times I_2 \times \cdots \times I_n \times \cdots \times I_N}$ by a matrix $M \in \mathbb{R}^{J_n \times I_n}$, denoted by $A \times_n M$, is a tensor $B \in \mathbb{R}^{I_1 \times \cdots \times I_{n-1} \times J_n \times I_{n+1} \times \cdots \times I_N}$, whose entries are $$B_{i_1 \ldots i_{n-1} j_n i_{n-1} \ldots i_N} = \sum_{i_n} a_{i_1 \ldots i_{n-1} i_n i_{n+1} \ldots i_N^m} j_n i_n.$$

The entries of the tensor B are computed by $$(A \times_n M)_{i_1 \ldots i_{n-1} j_n i_{n+1} \ldots i_N} = \sum_{i_n} a_{i_1 \ldots i_{n-1} i_n i_{n+1} \ldots i_N} m_{j_n i_n}.$$

The mode-n product can be represented as $B = A \times_n M$, or in terms of flattened matrices as $B_{(n)} = M A_{(n)}$. The mode-n product of a tensor and a matrix is a special case of the inner product in multilinear algebra and tensor analysis. The mode-n product is often denoted using Einstein summation notation, but for purposes of clarity, the mode-n product symbol will be used. The mode-n product has the following properties:

1. Given a tensor $A \in \mathbb{R}^{I_1 \times \cdots \times I_n \times \cdots \times I_m \cdots}$ and two matrices, $U \in \mathbb{R}^{J_m \times I_m}$ and $V \in \mathbb{R}^{J_n \times I_n}$ the following property holds true:

$$\begin{aligned} A \times_m U \times_n V &= (A \times_m U) \times_n V \\ &= (A \times_n V) \times_m U \\ &= A \times_n V \times_m U \end{aligned}$$

2. Given a tensor $A \in \mathbb{R}^{I_1 \times \cdots \times I_n \times \cdots \times I_N}$ and two matrices, $U \in \mathbb{R}^{J_n \times I_n}$ and $V \in \mathbb{R}^{K_n \times J_n}$ the following property holds true:

$$(A \times_n U) \times_n V = A \times_n (VU)$$

An $N^{th}$-order tensor $A \in \mathbb{R}^{I_1 \times I_2 \times \cdots \times I_N}$ has a rank-1 when it is able to be represented as the outer product of N vectors: $A = u_1 \circ u_2 \circ \ldots \circ u_N$. The tensor element is represented as $a_{ij\ldots m} = u_{1i} u_{2j} \ldots u_{Nm}$, where $u_{1i}$ is the $i^{th}$ component of $u_1$, etc. The rank of a $N^{th}$ order tensor A, denoted $R = \text{rank}(A)$, is the minimal number of rank-1 tensors that yield A in a linear combination:

$$A = \sum_{r=1}^{R} \sigma_r u_1^{(r)} \circ u_2^{(r)} \circ \ldots \circ u_N^{(r)}.$$

A singular value decomposition (SVD) can be represented as a rank decomposition as is shown in the following simple example:

$$\begin{aligned} M &= \begin{bmatrix} a & b \\ c & d \end{bmatrix} \begin{bmatrix} \sigma_{11} & 0 \\ 0 & \sigma_{22} \end{bmatrix} \begin{bmatrix} f & g \\ h & i \end{bmatrix} = \sigma_{11} \begin{bmatrix} a \\ c \end{bmatrix} \circ \begin{bmatrix} f \\ g \end{bmatrix} + \sigma_{22} \begin{bmatrix} b \\ d \end{bmatrix} \circ \\ &= U_1 \sum U_2^T \\ &= [u_1^{(1)} \; u_1^{(2)}] \begin{bmatrix} \sigma_{11} & 0 \\ 0 & \sigma_{22} \end{bmatrix} [u_2^{(1)} \; u_2^{(2)}]^T \end{aligned}$$

$$= \sum_{i=1}^{R=2} \sum_{j=1}^{R=2} \sigma_{ij} u_1^{(i)} \circ u_2^{(j)}$$

It should be noted that an SVD is a combinatorial orthogonal rank decomposition, but that the reverse is not true; in general, rank decomposition is not necessarily singular value decomposition. Also, the N-mode SVD can be represented as an expansion of mutually orthogonal rank-1 tensors, as follows:

$$D = \sum_{i_1=1}^{R_1} \cdots \sum_{i_n=1}^{R_n} \cdots \sum_{i_N=1}^{R_N} \cdots z_{i_1 \ldots i_N} U_1^{(i_1)} \circ \ldots \circ U_n^{(i_n)} \circ \ldots U_N^{(i_N)},$$

where $U_n^{(i_n)}$ is the $i_n$ column vector of the matrix $U_n$. This is analogous to the equation $$\sum_{i=1}^{R=2} \sum_{j=1}^{R=2} \sigma_{ij} u_1^{(i)} \circ u_2^{(j)}.$$

A client interface application can be stored in the data storage units 118, 128 of the first and second client servers 114, 124, respectively. The client interface application preferably allows the user to control the multilinear data analysis application described previously. For example, the client interface application can instruct the multilinear data analysis application to generate new data describing a particular characteristic of a known object that may be different from those characteristics of the known object which were already observed. In addition, the client interface application can instruct the multilinear data analysis application to generate new data describing a particular characteristic of the remainder of the population of observed objects that are different from those characteristics of the remainder of the population already observed. Also, the client interface application can instruct the multilinear data analysis application to recognize an unknown object from the population of observed objects, recognize a characteristic of a known object from the characteristics of the known object already observed, dimensionally reduce the amount of data stored to describe a characteristic of a known object, etc. In one exemplary embodiment of the present invention, the object can be any physical object and the characteristic may be a viewpoint. In another embodiment of the present invention, the object can be any physical object and the characteristic may be an illumination. In response to the client interface application's instructions, the multilinear data analysis application may transmit to the client interface application certain information describing the requested characteristic or object.

A. Image Signature Using a Tensor Representation of a Corpus of Data

Figure 2:
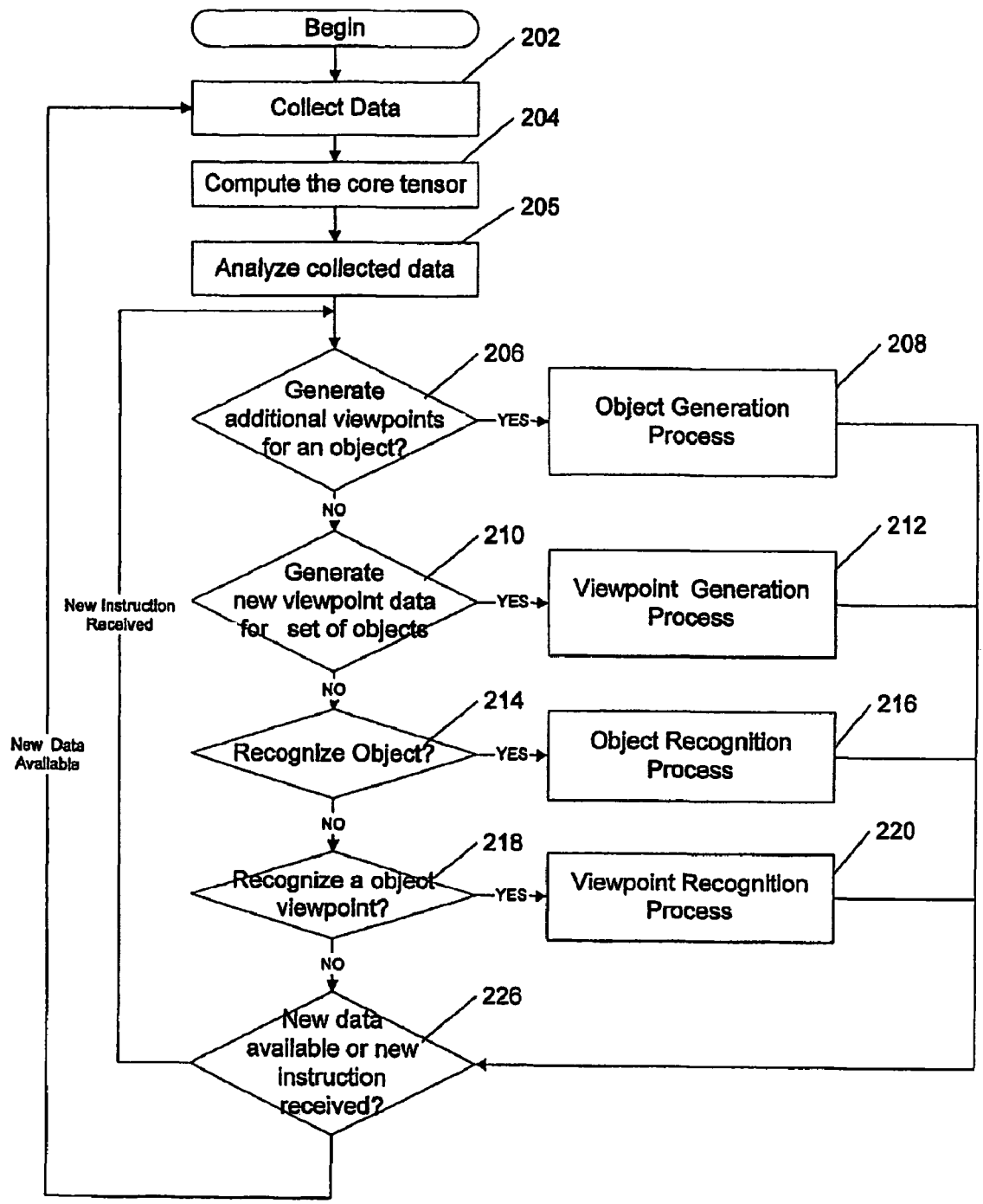
FIG. 2 is a flow diagram of an exemplary embodiment of a process according to the present invention which analyzes multilinear data.

FIG. 2 illustrates flow diagram of an exemplary embodiment of a process 200 which is indicative of the multilinear data analysis application. As described above for the multilinear data analysis application, the process 200 is configured to recognize the unknown object, recognize the unknown viewpoint from which the known object is being observed, generate a known viewpoint from which the object has not been observed, etc. In particular the multilinear data analysis application utilizes the corpus of image data, which is collected using the data capturing system 112 from different objects. This corpus of image information is stored in the database 108 of the server 102, and describes the surface appearance of an object, including complex details such as self-occlusion and self-shadowing. The corpus of image information can be organized as a tensor D. It should be understood that the corpus of image information can also be organized as a matrix D or a vector d. For example, if the information is organized as a matrix D, the process 200 preferably remains the same, but the underlying tensor procedures could be converted to matrix procedure equivalents. It should also be noted that representing the data contained in the tensor D may integrate multiple indices into a singular matrix index. Likewise, if the information is organized as a vector d, the process 200 preferably remains the same, but the underlying tensor procedures could be converted to vector procedure equivalents. It should also be noted that representing the data contained in the tensor D may integrate multiple indices into a singular vector index.

The corpus of image data is preferably collected from different objects from at least one viewpoint which forms the tensor D. Each viewpoint can be repeated multiple times, and a image cycle can be segmented from each image sequence. For example, in order to suppress noise, the collected image data can be passed through a low-pass fourth-order Butterworth filter at a cut off frequency of 6 Hz, and missing data may be interpolated with a cubic spline. Illumination represents the image information of the objects. The illuminations are stored in the tensor D. Such tensor D can have the form of a $IR^{G \times M \times T}$, where G is the number of objects, M is the number of viewpoint classes, and T is the number of illuminations.

In an exemplary implementation of a preferred embodiment according to the present invention, three viewpoints are collected for each object. In another exemplary implementation, each viewpoint can be repeated ten (10) times. In yet another exemplary implementation, images can be recorded using the VICON system that employs five cameras. The cameras can be positioned to record various viewpoints of an object.

Turning to further particulars of FIG. 2, in step 202, the process 200 collects image information or data on various objects from different viewpoints, e.g., new image data. The image data is collected as a group of vectors. Each of the group of vectors represents an object observed from a viewpoint. If each of the possible the viewpoints and the object are known, the data can be integrated into the tensor D. If the viewpoint or object are not known, such data would likely not be integrated into the tensor D until those pieces of information are determined. The data describing an unknown viewpoint or object is organized as a new data tensor $D_{p,a}$ of a new object or a new data vector d of a new object. The new data tensor $D_{p,a}$ includes more than one new data vector d. Each new data vector d of the new data tensor $D_{p,a}$ describes the image of object p performing viewpoint a.

At step 204, the process 200 solves for a core tensor Z which can be generally used for defining the inter-relationships between the orthonormal mode matrices. This step represents an N-mode singular value decomposition ("SVD") process 204, shown in FIG. 3, and described in further detail herein. It should be noted that the N-mode SVD procedure of step 204 is an orthonormal decomposition procedure. The N-mode SVD procedure of step 204 solves for the core tensor Z. When this procedure of step 204 determines the core tensor Z, the process 200 advances to step 205.

In an alternate embodiment of the present invention, an alternate n-mode orthonormal decomposition procedure is used in place of the n-mode SVD procedure.

In step 205, the process 200 analyzes the data collected in the step 202. With the knowledge of image sequences of several objects, the tensor D can take the form of a $IR^{G \times M \times T}$ tensor, where G is the number of objects, M is the number of viewpoint classes, and T is the number of illuminations. The N-mode SVD procedure of step 204 decomposes the tensor D into the product of a core tensor Z, and three orthogonal matrices as follows:

$$D = Z \times_1 P \times_2 A \times_3 J,$$

The object matrix $P=[p_1 \ldots p_n \ldots p_G]^T$, whose object-specific row vectors $p_n^T$ span the space of object parameters, encodes the per-object invariance across viewpoints. Thus, the matrix P contains the object or human image signatures. The viewpoint matrix $A=[a_1 \, a_m \, a_M]^T$, whose viewpoint specific row vectors $a_n^T$ span the space of viewpoint parameters, encodes the invariance for each viewpoint across different objects. The illumination matrix J whose row vectors which span the space of illuminations are preferably the eigenimages, the image variation.

The product $Z \times_3 J$ transforms the eigenimages into tensorimages, a tensor representaion of the variation and co-variation of modes (objects and viewpoint classes). The product $Z \times_3 J$ also characterizes how the object's parameters and viewpoint parameters interact with one another. The tensor $$B = Z \times_2 A \times_3 J$$

is a viewpoint specific tensorimage, which contains a set of basis matrices for all the images associated with particular viewpoints. The tensor $$C = Z \times_1 P \times_3 J$$

is an object/signature specific tensorimage, which preferably contains a set of basis matrices for all the images associated with particular objects (with particular object image signatures). The core tensor Z, the matrix A, and the matrix J generated by the N-mode SVD procedure of step 204 of the tensor D define a generative model.

In step 206, the process 200 determines whether it has been instructed by the client interface application to synthesize new data describing at least one known viewpoint that was never before recorded of a new object. If the process 200 has received such instruction, step 208 is executed to perform advances to an object generation procedure, as shown in further detail in FIG. 4 and described herein. When the object generation procedure of step 208 is complete, the process 200 advances to step 226.

In step 210, the process 200 determines if it was instructed by the client interface application to synthesize new data describing a new viewpoint that was never before recorded of the remainder of the population of observed objects. If the process 200 has received such instruction, the process 200 continues to a viewpoint generation procedure of step 212, as shown in further detail in FIG. 5 and described herein. When the viewpoint generation procedure of step 212 is completed, the process 200 is forwarded to step 226.

In step 214, the process 200 determines if it was instructed by the client interface application to recognize an unknown object that has been observed to perform a known viewpoint as one of the population of observed known objects. If the process 200 has received such instruction, the process 200 is directed to an object recognition procedure of step 216, as shown in greater detail in FIG. 6 and described infra. Once the object recognition process 216 is completed, the process 200 advances to step 226.

In a preferred embodiment, the process 200 is capable of recognizing an unknown object that has been observed performing an unknown viewpoint as one of the population of observed known objects.

Figure 7:
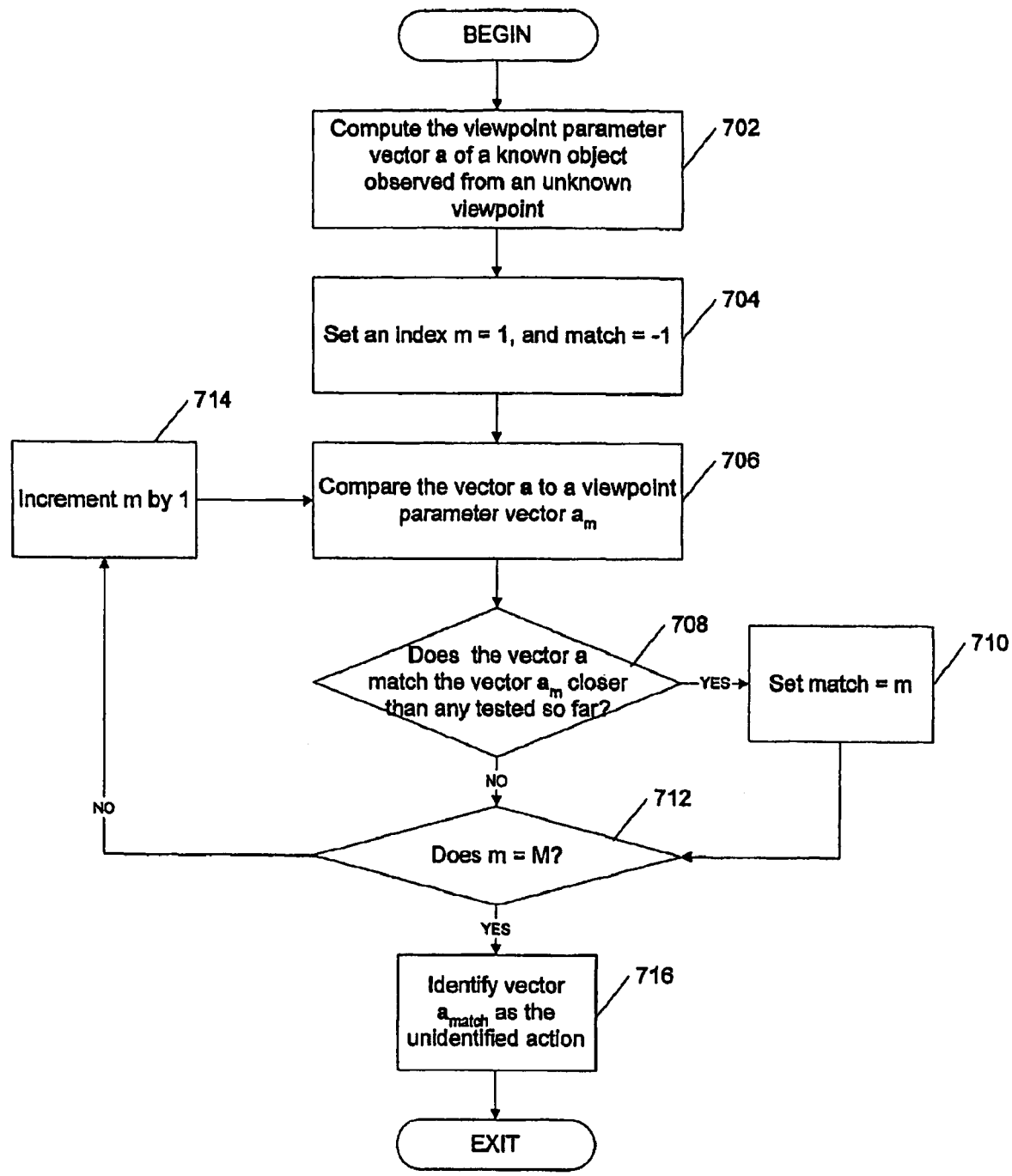
FIG. 7 is a flow diagram of an exemplary embodiment of a viewpoint recognition procedure of the process of FIG. 2 which recognizes an unknown viewpoint of a known object.

In step 218, the process 200 determines if it was instructed by client interface application to recognize an unknown viewpoint of a known object as one of the viewpoints already observed of the known object. If the process 200 has received such an instruction, the process 200 continues to a viewpoint recognition procedure of step 220, as shown in FIG. 7 and described infra. When the object recognition procedure of step 220 is completed, the process 200 is forwarded to step 226. Then in step 226, the process 200 determines whether a data set for a new object should be integrated into the tensor D or if the client interface application has transmitted a new instruction. In particular, if a data set for a new object is available, the process 200 advances to step 202. Otherwise, the process 200 received the new instruction from the client interface application, so the process 200 continues to step 206.

Figure 3:
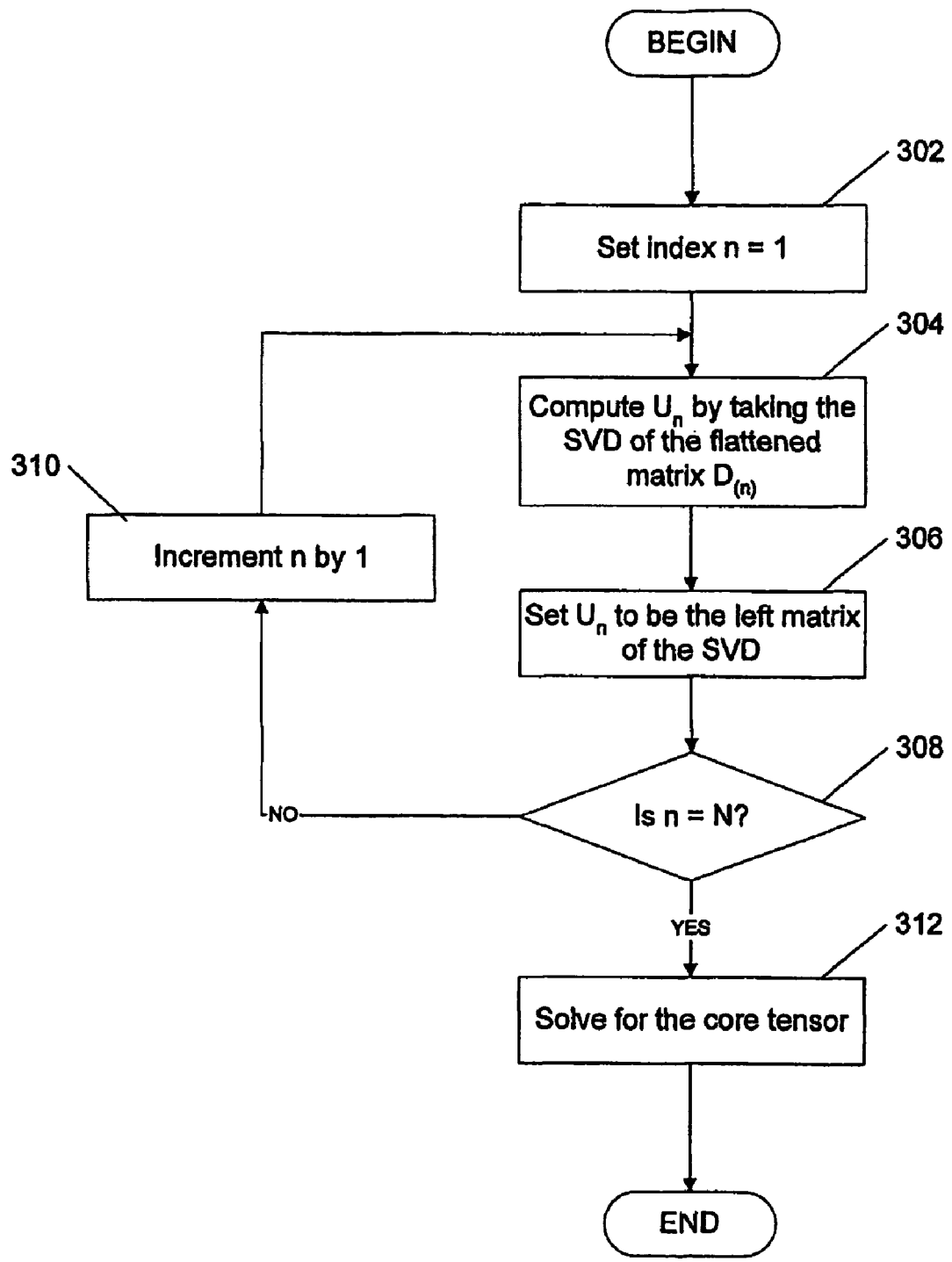
FIG. 3 is a flow diagram of an exemplary embodiment of a core tensor computation procedure of the process of FIG. 2 which performs an N-mode SVD algorithm for decomposing an N-dimensional tensor.

FIG. 3 illustrates the exemplary details N-mode SVD procedure of step 204 for performing an N-mode SVD algorithm to decompose the tensor D and compute the core tensor Z. The N-mode SVD procedure of step 204 is related to and grows out of a natural generalization of the SVD procedure for a matrix. For example, a matrix $D \in \mathrm{IR}^{J_1 \times J_2}$ is a two-mode mode mathematical object that has two associated vector spaces, e.g., a row space and a column space. The SVD procedure for a matrix orthogonalizes these two spaces, and decomposes the matrix as $D = U_1 \Sigma U_2^T$, with the product of an orthogonal column-space represented by the left matrix $U_1 \in \mathrm{IR}^{J_1 \times J_1}$, a diagonal singular value matrix $\Sigma \in \mathrm{IR}^{J_1 \times J_2}$, and an orthogonal row space represented by the right matrix $U_2 \in \mathrm{IR}^{J_2 \times J_2}$. In terms of the mode-n products defined above, this matrix product can be rewritten as $D = \Sigma \times_1 U_1 \times_2 U_2$. If the data contained within the tensor D is represented as a matrix D, the SVD procedure for a matrix can be used.

By extension, the tensor D can be an order-N tensor comprising N spaces, where N is preferrably greater than 2. N-mode SVD is a natural generalization of SVD that orthogonalizes these N spaces, and decomposes the tensor as the mode-n product of N-orthonormal spaces.

$$D = Z \times_1 U_1 \times_2 U_2 \ldots \times_n U_n \ldots \times_N U_N,$$

A matrix representation of the N-mode SVD can be obtained by:

$$D_{(n)} = U_n Z_{(n)} (U_{n+1} U_{n+2} \ldots U_{N1} \ldots U_{n-1})^T$$

where is the matrix Kronecker product. The core tensor Z, can be analogous to the diagonal singular value matrix in conventional matrix SVD. It is important to realize, however, that the core tensor does not have a diagonal structure; rather, Z is in general a full tensor. The core tensor Z governs the interviewpoint between mode matrices $U_n$, for n= 1, ..., N. Mode matrix $U_n$ contains the orthonormal vectors spanning the column space of the matrix $D_{(n)}$ that results from the mode-n flattening of the tensor D, as illustrated in FIGS. 12A-12F.

As shown in FIG. 3, the procedure of step 204 begins at step 302 by setting an index n to one (1). This allows the process 204 to begin computing an initial matrix from the tensor D. When the index n is set to one, the procedure of step 204 advances to step 304. In step 304, the procedure of step 204 computes the matrix $U_n$ as defined by $D = Z \times_1 U_1 \times_2 U_2 \ldots \times_n U_n \ldots \times_N U_N$, by computing the SVD of the flattened matrix $D_{(n)}$. Once the matrix $U_n$ is computed, the procedure of step 204 continues to step 306. In step 306 the procedure of step 204 sets the matrix $U_n$ to be a left matrix of the SVD. Once the matrix $U_n$ is set appropriately, the procedure of step 204 goes on to step 308, in which it is determined whether the index n is equal to the order of the tensor, i.e. N. If the index n is equal to the order of the tensor, the procedure of step 204 advances to step 312. Otherwise, the process 204 is forwarded to step 310. In step 310, the index n is incremented by one, and then the procedure of step 204 is directed to step 304. In step 312, the core tensor Z is solved for as follows:

$$Z = D \times_1 U_1^T \times_2 U_2^T \ldots \times_n U_n^T \ldots \times_N U_N^T.$$

When the core tensor Z is selected, the procedure of step 204 is completed.

It should be noted that when $D_{(n)}$ is a non-square matrix, the computation of $U_n$ in the singular value decomposition $D_{(n)} = U_n \Sigma V_n^T$ can be performed, depending on which dimension of $D_{(n)}$ is smaller, by decomposing either $D_{(n)} D_{(n)}^T = U_n \Sigma^2 U_n^T$ and then computing $V_n^T = \Sigma^+ U_n^T D_{(n)}$, or by decomposing $D_{(n)}^T D_{(n)} = V_n \Sigma^2 V_n^T$ and then computing $U_n = D_{(n)} V_n \Sigma^+$.

Figure 4:
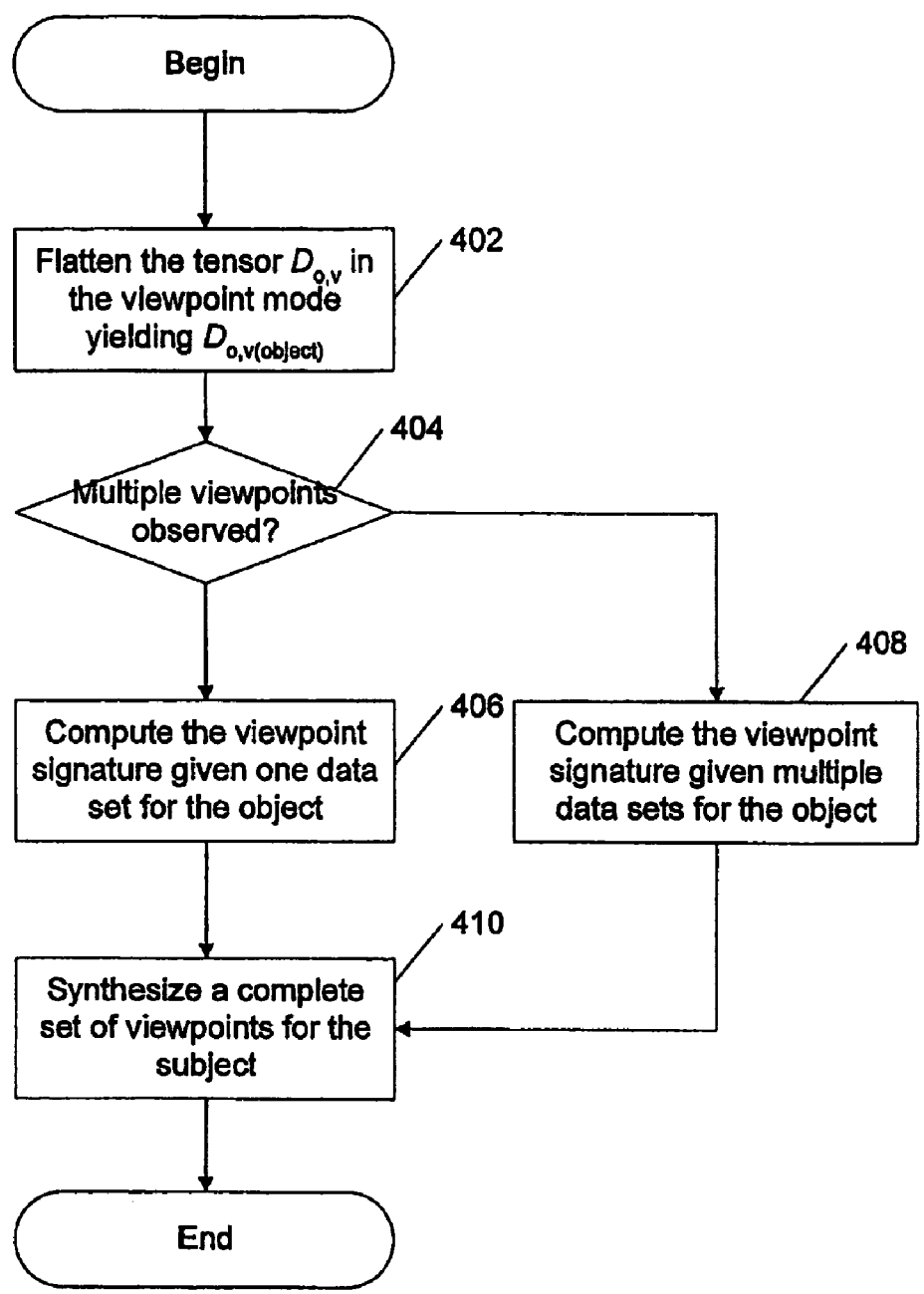
FIG. 4 is a flow diagram of an exemplary embodiment of a process of FIG. 2 which synthesizes the remaining viewpoints for an object.

FIG. 4 illustrates the details of the object generation procedure of step 208, which synthesizes the remaining viewpoints, which were never before seen, for a new object. The remaining viewpoints are generated given the new image data tensor $D_{p,a}$ of the new object observed from the viewpoint a, which includes at least one viewpoint. The object generation procedure of step 208 solves for the signature p of the new object in the equation $D_{p,a} = B_a \times_1 p^T$, where $B_a = Z \times_2 a_a^T \times_3 J$. It should be noted that new data tensor $D_{p,a}$ is a 1×1×T tensor. In particular, step 402 of this procedure flattens the new data tensor $D_{p,a}$ in the object mode, yielding a row vector $d_a^T$. By flattening this new data tensor in the object mode, the matrix $D_{p,a(object)}$ is generated, and in particular a row vector which we can denote as $d_a^T$ is produced. Therefore, in terms of the flattened tensors, the equation $D_{p,a} = B_a \times_1 p^T$ described above can be written as $d_a^T = p^T B_{a(subject)}$ or $d_a = B_{a(objects)}^T p$. Once the tensor is flattened, the process advances to step 404, in which it is determined if the object is observed from a single viewpoint. If the object is observed from a single viewpoint, the procedure of step 208 is forwarded to step 406. If the object is observed from at least two viewpoints, the procedure of step 208 advances to step 408. In step 406, the image signature for the object given a single observed viewpoint is computed. The image signature for the object can be defined as $p^T = d_a^T B_{a(objects)}^{-1}$. When the image signature for the object is computed, the procedure of step 208 is completed. Also in step 408, the image signature for the object given at least two observed viewpoints is determined. If several different viewpoints $d_{a,k}$ are observed, the image signature can be computed as follows:

$$p_t = [\cdots d_{nk}^T \cdots ] \begin{bmatrix} \vdots \\ B_{ak(objects)}^{-1} \\ \vdots \end{bmatrix}.$$

In step 410, the procedure of step 208 synthesizes a complete set of images for the object. The complete set of images for the new object can be synthesized as follows:

$$D_p = B \times_1 p^T,$$

where B is defined as $B = Z \times_2 A \times_3 J$, as described above. When the image signature is computed for the object, the process 208 exits.

Figure 5:
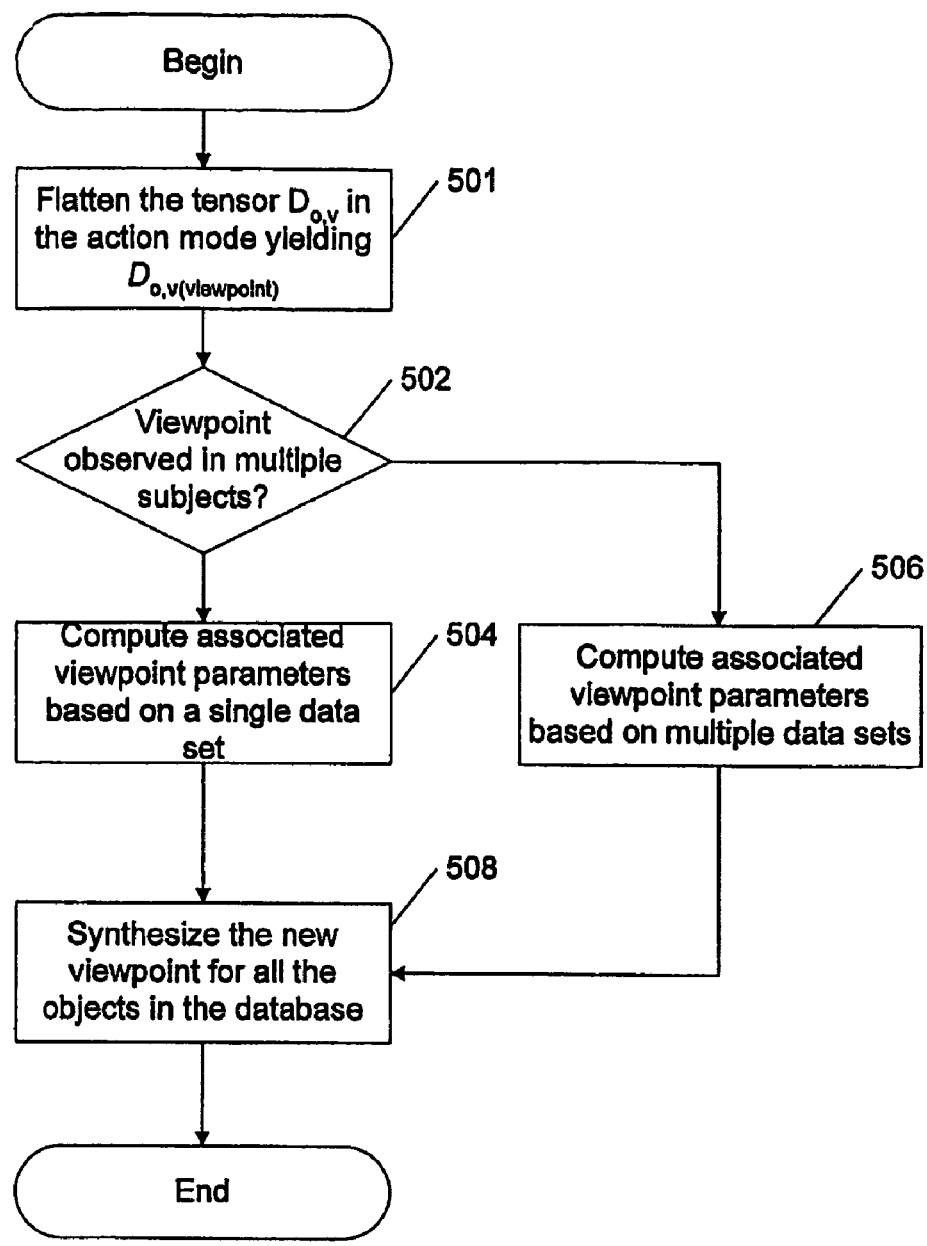
FIG. 5 is a flow diagram of an exemplary embodiment of a viewpoint generation procedure of the process of FIG. 2 which synthesizes an observed viewpoint for a set of objects.

FIG. 5 illustrates details of the viewpoint generation procedure of step 212, which synthesizes an observed new viewpoint that has never before been seen for the remainder of the objects represented in the object matrix P. The observed viewpoint for the remainder of the objects represented in the object matrix P is generated given the new image data tensor $D_{p,a}$ of at least one object from the new viewpoint a.

In particular, step 501 of this procedure flattens the new data tensor $D_{p,a}$ in the viewpoint mode, yielding a row vector $d_p^T$. By flattening this new data tensor in the viewpoint mode, the matrix $D_{p,a(viewpoint)}$ is generated, and in particular a row vector which we can denote as $d_p^T$ is produced. Therefore, in terms of the flattened tensors, the equation $D_{p,a} = C_p \times_2 a^T$ described above can be written as $d_p^T = a^T C_{p(viewpoints)}$ or $d_p = C_{p(viewpoints)}^T a$. Once the tensor is flattened, this procedure determines as to whether the new image data tensor $D_{p,a}$ represents one object from the new viewpoint in step 502. If the new image data tensor $D_{p,a}$ represents one object from the new viewpoint, the procedure of step 212 advances to step 504. If the new image data tensor $D_{p,a}$ represents more than one object from the new viewpoint, the procedure of step 212 is forwarded to step 506. In step 504, the associated viewpoint parameters are determined based on the new image data tensor $D_{p,a}$, which represents one object from the new viewpoint. If a known object, e.g., an object that is already recorded in the image database, performs a new type of viewpoint $d_p$, it is possible to compute the associated viewpoint parameters $a^T = d_p^T C_{p(viewpoints)}^{-1}$. When the associated viewpoint parameters are computed, the procedure of step 212 is directed to step 508.

In step 506, the associated viewpoint parameters are computed based on the new image data tensor $D_{p,a}$, which represents more than one object from the new viewpoint. If several different objects are observed performing the same new viewpoint $d_{pk}$, the viewpoint parameters are computed as follows:

$$a^T = [\cdots d_{Pk}^T \cdots ] \begin{bmatrix} \vdots \\ C_{Pk(viewpoints)}^{-1} \\ \vdots \end{bmatrix}.$$

When the associated viewpoint parameters are computed, the process 212 advances to step 508, in which the new viewpoints are obtained for the remainder of the objects represented in the object matrix P. The new viewpoint for all the objects in the database can be synthesized as follows: $D_a = C \times_2 a^T$, where C is given as $C = Z \times_1 P \times_3 J$, supra. When the new viewpoint is synthesized, the procedure of step 212 is completed.

Figure 6:
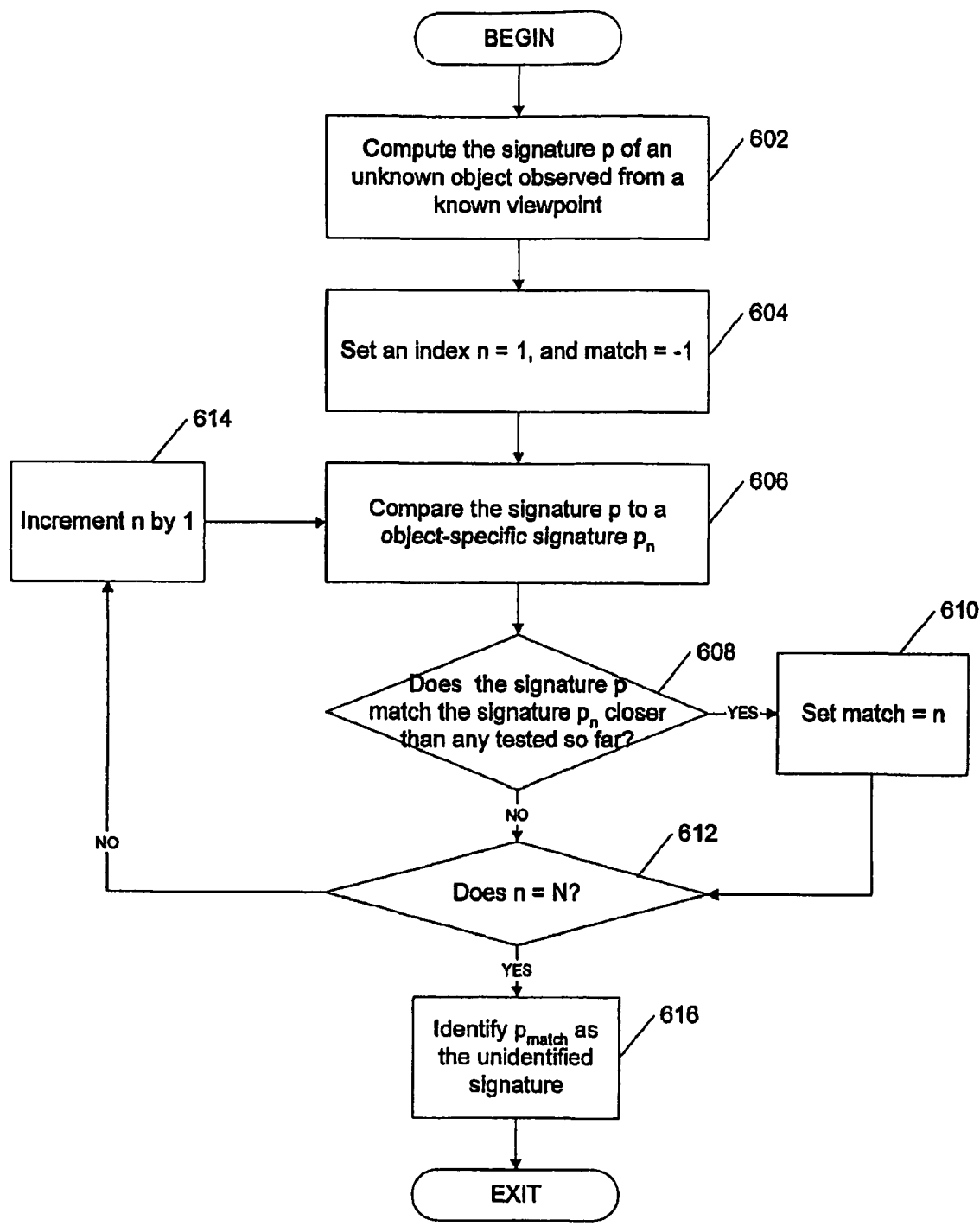
FIG. 6 is a flow diagram of an exemplary embodiment of an object recognition procedure of the process of FIG. 2 which recognizes an unidentified object from a known viewpoint as one of a group of objects.

FIG. 6 illustrates an object recognition procedure of step 216 for recognizing an unidentified object from a known viewpoint. Multilinear analysis, can provide basis tensors that map certain observed images into the space of object parameters (thereby enabling the recognition of objects from image data) or the space of viewpoint parameters (thereby enabling the recognition of viewpoint from image data). The object recognition process 216 begins at step 602, in which the signature p of an unknown object from a known viewpoint is computed. The new image vector d of a known viewpoint a can be mapped into the object signature space, by computing the signature $p = B_{a(objects)}^{-T} d$. Once the signature is computed, the process 216 advances to step 604, in which an index variable n and a variable match are initialized. For example, the index variable n can be initialized to one (1) and the variable match may be initialized to negative one (−1). Once these variables are initialized, step 606 is performed in which, the signature p is compared to an object signature $p_n$. This signature is compared against each of the object signatures $p_n$ in P. Then the magnitude of the difference between the signature p and the signature $p_n$, i.e. $\|p - p_n\|$ is determined.

Thereafter, in step 608, it is determined whether a process-computed magnitude of the difference between the signature p and the signature $p_n$ is smaller than any magnitude computed up to this point. If the magnitude of the difference between the signature p and the signature $p_n$ is smaller than any difference computed up to this point, the process 216 advances to step 610. Otherwise, the process 216 is forwarded to step 612. In step 610, the variable match is set to be equal to the index n. The variable match generally signifies the index of the recognized object, such that the signature p most closely matches the signature $p_{match}$.

Then, in step 612, it is determined if the index n is equal to G. If that is the case, the procedure of step 216 advances to step 616, otherwise the procedure of step 216 is forwarded to step 614. In step 614, the index n is incremented by one (1), and the procedure is returned to step 606, such that each of the objects in the object matrix P from 1 to G is objected to the comparison. Finally, in step 616, the signature $p_{match}$ is identified as the signature that most closely approximates the signature p. In a preferred embodiment of the present invention, the variable match is an indexed array, which records the indices of multiple signatures that most closely match the signature p. Once the signature $p_{match}$ is identified, the procedure of step 216 is completed.

FIG. 7 illustrates the details of a viewpoint recognition procedure of step 220 for recognizing an unknown viewpoint of a known object. Generally, a multilinear analysis yields basis tensors that map the observed images into the space of viewpoint parameters, thus enabling the recognition of viewpoints from the image data. In particular, step 702 computes the vector a of a known object from an unknown viewpoint. The new image data vector d of a known object p can be mapped into the viewpoint parameter space by computing the vector $a = C_{p(viewpoints)}^{-T} d$. When the vector a is determined, the procedure of step 220 advances to step 704, in which an index variable m and a variable match are initialized. The index variable m can be initialized to one (1), and the variable match may be initialized to negative one (−1). Once these variables are initialized, the process 220 is forwarded to step 706, in which the vector a is compared to a viewpoint parameter vector $a_m$. In particular, the vector a is compared against each of the viewpoint parameter vectors $a_m$ in A, in turn, as the index m is incremented. The magnitude of the difference between the vector a and the viewpoint parameter vector $a_m$, i.e. $\|a-a_m\|$, is also determined.

In step 708, the procedure of step 220 determines whether process computed magnitude of the difference between the vector a and the viewpoint parameter vector $a_m$ is smaller than any difference computed up to this point. If the magnitude of the difference between the vector a and the viewpoint parameter vector $a_m$ is smaller than any difference computed up to this point, the procedure of step 220 advances to step 710. Otherwise, the procedure of step 220 is forwarded to step 712. In step 710, the procedure of step 220 sets the variable match is set to be equal to the index m. The variable match generally signifies the index of the recognized viewpoint, such that the vector a most closely matches the viewpoint parameter vector $a_{match}$.

Then, in step 712, it is determined if the index m is equal to M. If that is the case, the procedure of step 220 advances to step 716, otherwise the procedure is forwarded to step 714. Step 714, indicates that the index m is incremented by one (1), and the procedure advances to step 706, such that the index m increments through each of the viewpoints in the viewpoint matrix A from 1 to M. In step 714, the viewpoint parameter vector $a_{match}$ is identified as the signature that most closely approximates the vector a. In a preferred embodiment of the present invention, the variable match can be an indexed array, which records the indices of multiple viewpoints that most closely match the vector a. Once the viewpoint parameter vector $a_{match}$ is identified, the procedure of step 220 is completed.

B. Facial Signatures Using a Tensor Representation of a Corpus of Data

Figure 8:
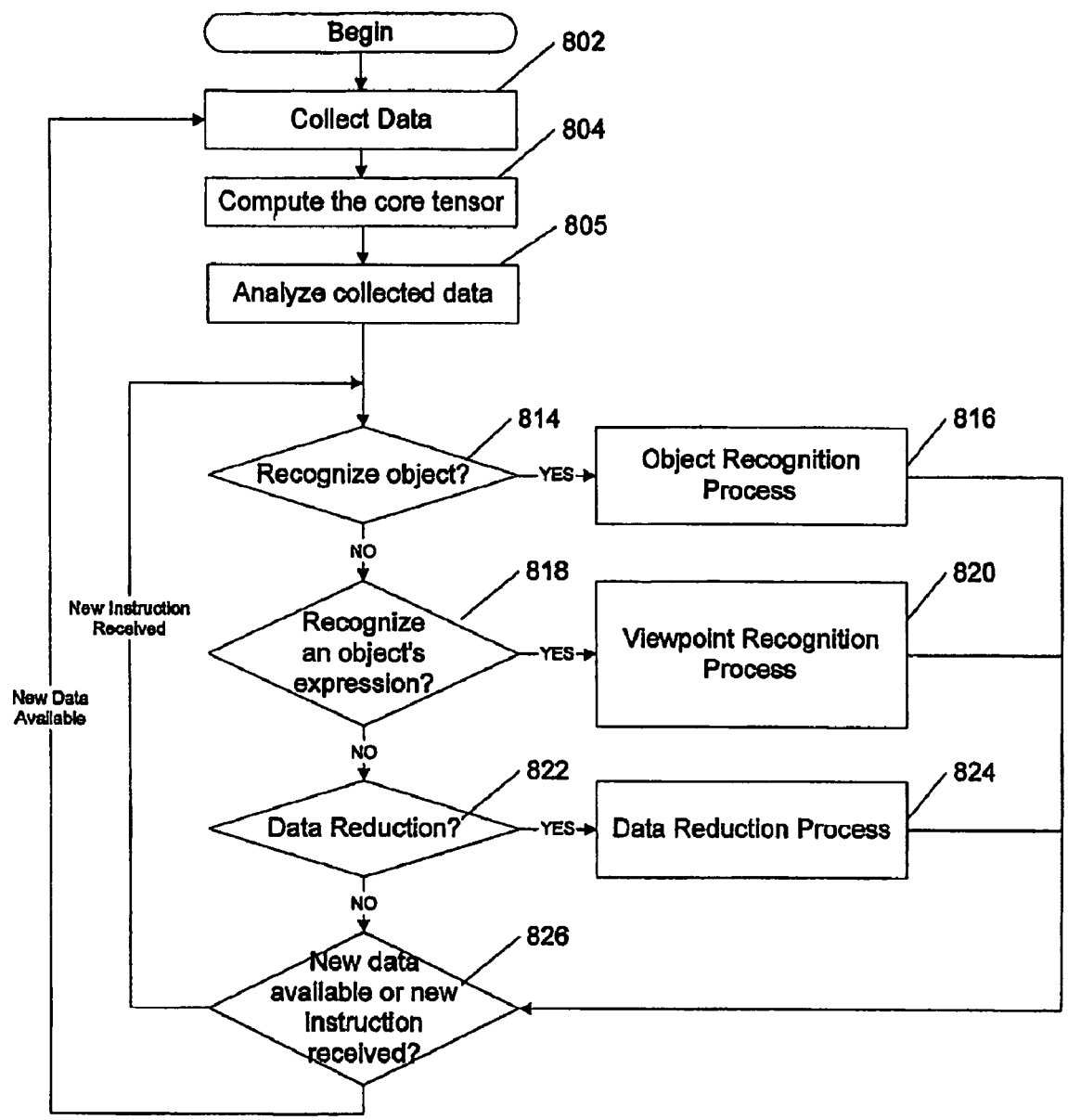
FIG. 8 is a flow diagram of another exemplary embodiment of a process according to the present invention which analyzes multilinear data.

FIG. 8 illustrates a flow diagram of an exemplary embodiment of a process implementing a multilinear data analysis application 800 according to the present invention. As described above, the multilinear data analysis application 800 may be configured to recognize an unknown object, an unknown viewpoint, and dimensionally reduce the amount of data describing illuminations, etc. The multilinear data analysis application 800 utilizes a corpus of image data, which is collected using the data capturing system 112 from different objects. The corpus of image information can be stored in the database 108 of the server 102. This corpus of image information may describe the illuminations, the viewpoints, and the objects captured in images made of pixels. The corpus of image information is organized as a tensor D. The tensor D takes the form of a $IR^{G \times I \times E \times P}$ tensor, where G is the number of objects, I is the number of illuminations, E is the number of viewpoints, and P is the number of pixels. It should be understood that the corpus of image information can also be organized as a matrix D or a vector d. For example, if the information is organized as a matrix D, the process 800 preferably remains the same, but the underlying tensor procedures could be converted to matrix procedure equivalents. It should also be noted that representing the data contained in the tensor D may integrate multiple indices into a singular matrix index. Likewise, if the information is organized as a vector d, the process 800 preferably remains the same, but the underlying tensor procedures could be converted to vector procedure equivalents. It should also be noted that representing the data contained in the tensor D may integrate multiple indices into a singular vector index.

In a preferred embodiment of the present invention, three viewpoints can be collected for each object. Each viewpoint may be captured in four different illuminations, i.e. light positions. The four different illuminations may be one light from the center, one light from the right, one light from the left, and two lights one from the right and one from the left. The three different viewpoints may be center, 34 degrees to the right, and 34 degrees to the left. In another preferred embodiment of the present invention, further similar viewpoints are collected for each object such that each viewpoint is captured in four different illuminations. For example, the four different illuminations are one light from the center, one light from the right, one light from the left, and two lights one from the right and one from the left. The two different viewpoints are 17 degrees to the right, and 17 degrees to the left. In still another exemplary embodiment of the present invention, each viewpoint is captured in three different illuminations and five different viewpoints. For example, the three different illuminations are one light from the center, one light from the right, and one light from the left. Also, the five different viewpoints are center, 17 degrees to the right, 17 degrees to the left, 34 degrees to the right, and 34 degrees to the left.

As shown in FIG. 8 step 802 provides that the multilinear data analysis application 800 collects image information describing the illumination, viewpoint, and object. New image data is collected describing the illumination of individual pixels of viewpoints of objects. If each of the illuminations, each of the viewpoints, and each of the pixels for a given object are known, the data is integrated to the tensor D. Otherwise, the data cannot be integrated into the tensor D until those pieces of information are determined. The data describing an unknown illumination, pixel, viewpoint or object is organized as a new data vector d. The new data vector d describes an image having certain illumination and viewpoint data. Then in step 804, the multilinear data analysis application 800 solves for the core tensor Z. For example, this step can be an N-mode SVD procedure 304 as shown in FIG. 3 and described below in relation to FIG. 3. The N-mode SVD procedure 304 solves for the core tensor Z with N being equal to 4. When the procedure 804 or 304 computes the core tensor Z, the multilinear data analysis application 800 advances to step 806. Given the tensor D takes the form of a $IR^{G \times I \times E \times P}$ tensor, where G is the number of objects, I is the number of illuminations, E is the number of viewpoints, and P is the number of pixels. The N-mode SVD process 804 decomposed the tensor D as follows:

$$D = Z \times_1 U_{objects} \times_2 U_{illum} \times_3 U_{viewpoints} \times_4 U_{pixels}$$

where the G×I×E×P core tensor Z governs the interviewpoint between the factors represented in the 4 mode matrices: The G×G mode matrix $U_{objects}$ spans the space of object parameters, the I×I mode matrix $U_{illum}$ spans the space of illumination parameters and the E×E mode matrix $U_{viewpoints}$ spans the space of viewpoint parameters. The P×P mode matrix $U_{pixels}$ orthonormally spans the space of images.

The multilinear data analysis incorporates aspects of a linear principal component analysis ("PCA") analysis. Each column of $U_{objects}$ is an "eigenimage". These eigenimages are preferably identical to the conventional eigenfaces, since the eigenimages are computed by performing the SVD on the mode-4 flattened data tensor D so as to yield the matrix $D_{objects}$. One of the advantages of multilinear analysis is that the core tensor Z can transform the eigenimages in $U_{pixels}$ into a set of eigenmodes, which represent the principal axes of variation across the various modes (object, illuminations, viewpoints), and represent how the various factors interact with each other to create the image images. This can be accomplished by generating the product $Z \times_4 U_{pixels}$. In contrast, the PCA basis vectors or eigenimages represent only the principal axes of variation across images.

The image database can include V·I·E images for each object which vary with illumination and viewpoint. The PCA output represents each object as a set of V·I·E vector-valued co-efficients, one from each image in which the object appears.

Multilinear analysis allows each object to be represented, regardless of illumination, and viewpoint, with the same coefficient vector of dimension G relative to the bases comprising the G×I×E×P tensor $$D = Z \times_2 U_{illum} \times_3 U_{viewpoints} \times_4 U_{pixels}.$$

Each column in the tensor D is a basis matrix that comprises N eigenvectors. In any column, the first eigenvector depicts the average object, and the remaining eigenvectors capture the variability across objects for the particular combination of illumination and viewpoint associated with that column. Each image is represented with a set of coefficient vectors representing the object, view point, illumination and viewpoint factors that generated the image. Multilinear decomposition allows the multilinear data analysis application 800 to construct different types of basis depending on the instruction received from the client interface application.

In particular step 814 of FIG. 8 causes the multilinear data analysis application 800 to determine whether the client interface application has instructed the multilinear data analysis application 800 to recognize an unknown object that has been observed displaying a known viewpoint as one of the population of observed known objects. If the multilinear data analysis application 800 has received such instruction, the multilinear data analysis application 800 advances to an object recognition procedure of step 816, shown in greater detail in FIG. 9 and described infra. When the object recognition procedure of step 816 is completed as the multilinear data analysis application 800 advances to step 826. In step 818, the multilinear data analysis application 800 determines whether the client interface application has instructed the multilinear data analysis application 800 to recognize an unknown viewpoint of a known object as one of the viewpoints already observed of such known object. If the multilinear data analysis application 800 has received such instruction, the multilinear data analysis application 800 advances to an viewpoint recognition procedure of step 820, as shown in greater detail in FIG. 10 and described infra. When the viewpoint recognition procedure of step 820 is completed, the multilinear data analysis application 800 is forwarded to step 826.

Thereafter, in step 822, the multilinear data analysis application 800 determines whether the client interface application has instructed the multilinear data analysis application 800 to dimensionally reduce the amount of data describing illuminations. If the multilinear data analysis application 800 has received such instruction, the multilinear data analysis application 800 advances to a data reduction procedure of step 824, as shown in greater detail in FIG. 11 and described infra. Once the data reduction procedure of step 824 is complete, the multilinear data analysis application 800 advances to step 826. Finally, in step 826, the multilinear data analysis application 800 determines whether a data set for a new object should be collected or if the client interface application transmitted new instruction. If a data set for a new object displaying an viewpoint is available, the multilinear data analysis application 800 advances to step 802. If the multilinear data analysis application 800 has received a new instruction from the client interface application, the multilinear data analysis application 800 advances to step 814.

Figure 9:
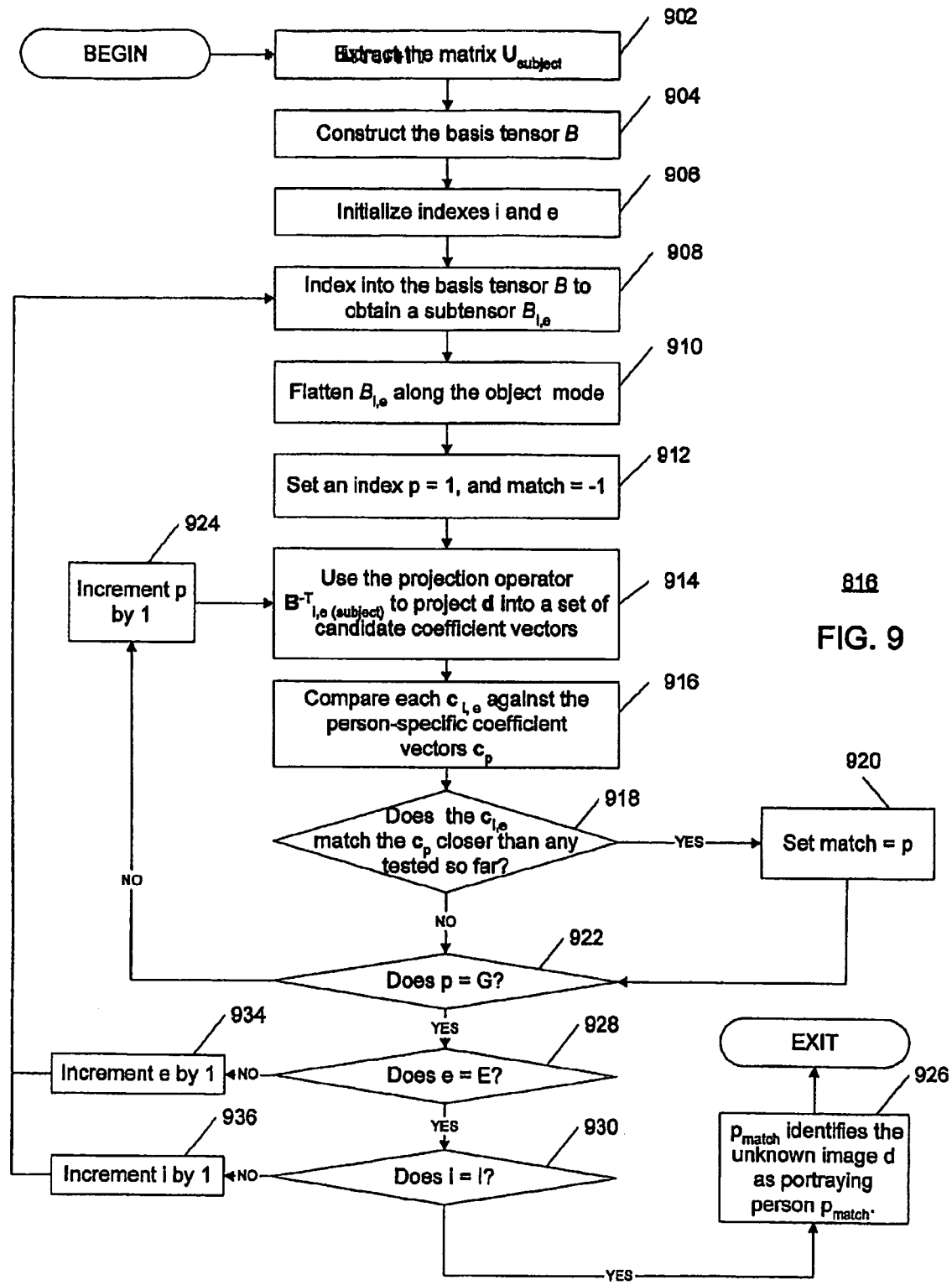
FIG. 9 is a flow diagram of an exemplary embodiment of the object recognition procedure of the process of FIG. 8 which recognizes an unidentified object given an unknown object image.

FIG. 9 illustrates a flow diagram of the details of the object recognition procedure of step 816 for recognizing an unidentified object given an unknown image: the new data vector d. The multilinear data analysis preferably yields a basis tensor (as defined below) that maps all images of an object to the same point in the object parameter space, thus creating a many-to-one mapping. The object recognition procedure of step 816 begins at step 902, in which the matrix $U_{objects}$ is extracted. The N-mode SVD procedure of step 804 (or step 304) decomposes the tensor D resulting in the viewpoint $D = Z \times_1 U_{objects} \times_2 U_{illum} \times_3 U_{viewpoints} \times_4 U_{pixels}$), and the matrix $U_{objects}$ is extracted from this viewpoint. In particular, the matrix $U_{objects}$ contains row vectors $c_p^T$ of coefficients for each object p. Once the matrix $U_{objects}$ is extracted, the procedure of step 816 advances to step 904, in which the basis tensor B is generated. The basis tensor B is constructed according to $B = Z \times_2 U_{illum} \times_3 U_{viewpoints} \times_4 U_{pixels}$. Upon the completion of the construction of the basis tensor B the procedure of step 816 advances to step 906 where this procedure initializes indexes i and e to one (1). At step 908, the object recognition procedure of step 816 indexes into the basis tensor B to obtain a sub-tensor $B_{i,e}$. This is performed for a particular illumination i and viewpoint e to obtain the subtensor $B_{i,e}$ having dimensions G×I×I×P.

Then, in step 910, the subtensor $B_{i,e}$ is flattened along the object mode. The subtensor $B_{i,e}$ is flattened along the object mode to obtain the G×P matrix $B_{i,e(object)}$. It should be noted that a specific training image $d_d$ of object p in illumination i and viewpoint e can be written as $d_{p,i,e} = B_{i,e(object)}^T c_p$; hence, $c_p = B_{i,e(object)}^{-T} d_{p,i,e}$.

Then, in step 912, an index variable p and a variable match are initialized. For example, the index variable p is initialized to one (1), and the variable match is initialized to negative one (−1). Once these variables are initialized, the procedure of step 816 advances to step 914, in which the projection operator $B_{i,e(object)}^{-T}$ is used to project the new data vector d into a set of candidate coefficient vectors. Given the new data vector d, the projection operator $B_{i,e(object)}^{-T}$ is used to project the new data vector d into a set of candidate coefficient vectors $c_{i,e} = B_{i,e(object)}^{-T} d$ for every i, e combination. In step 916, each of the set of candidate coefficient vectors $c_{i,e}$ is compared against the object-specific coefficient vectors $c_p$. The comparison can be made according to the following equation:

$$\|c_{i,e} - c_p\|.$$

In step 918, it is determined whether the set of candidate coefficient vectors $c_{i,e}$ is the closest match to the object-specific coefficient vectors $c_p$ up to this point. The best matching vector $c_p$ can be the one that yields the smallest value of $\|c_{i,e} - c_p\|$ among all illuminations and viewpoints. If the magnitude of the difference between the set of candidate coefficient vectors $c_{i,e}$ and the object-specific coefficient vectors $c_p$ is smaller than any difference computed up to this point, the procedure of step 816 advances to step 920. Otherwise, the magnitude of the difference between the set of candidate coefficient vectors $c_{i,e}$ and the procedure of step 816 is forwarded to step 922. Step 920 provides that the variable match is set to be equal to the index p. The variable match signifies the index of the most closely matched object, such that the set of candidate coefficient vectors $c_{i,e}$ most closely matches the object-specific coefficient vectors $c_{match}$.

Thereafter, in step 922, it is determined if the index p is equal to G. If that is the case, the procedure of step 816 advances to step 928; otherwise, the procedure of step 816 advances to step 924. In step 924, the index p is incremented by one (1), and the procedure of step 816 advances to step 914, such that the procedure tests each of the objects in the object matrix $U_{object}$ from 1 to G.

In step 928, it is determined if the index e is equal to E. If that is the case, the procedure of step 816 sets the index e equal to one (1) and advances to step 930; otherwise, the procedure of step 816 advances to step 934. In step 934, the index e is incremented by one (1), and the procedure of step 816 advances to step 908, such that the procedure tests each of the objects in the object matrix $U_{viewpoints}$ from 1 to E.

In step 930, it is determined if the index i is equal to I. If that is the case, the procedure of step 816 advances to step 926; otherwise, the procedure of step 816 advances to step 936. In step 936, the index i is incremented by one (1), and the procedure of step 816 advances to step 908, such that the procedure tests each of the objects in the object matrix $U_{illum}$ from 1 to I. Finally, in step 926, the object match can be identified as the object portrayed in the new data vector d. In a preferred embodiment of the present invention, the variable match can be an indexed array, that records the indices of multiple objects most closely matching the objects portrayed in the new data vector d. Once the object match is identified, the procedure of step 816 is completed.

Figure 10:
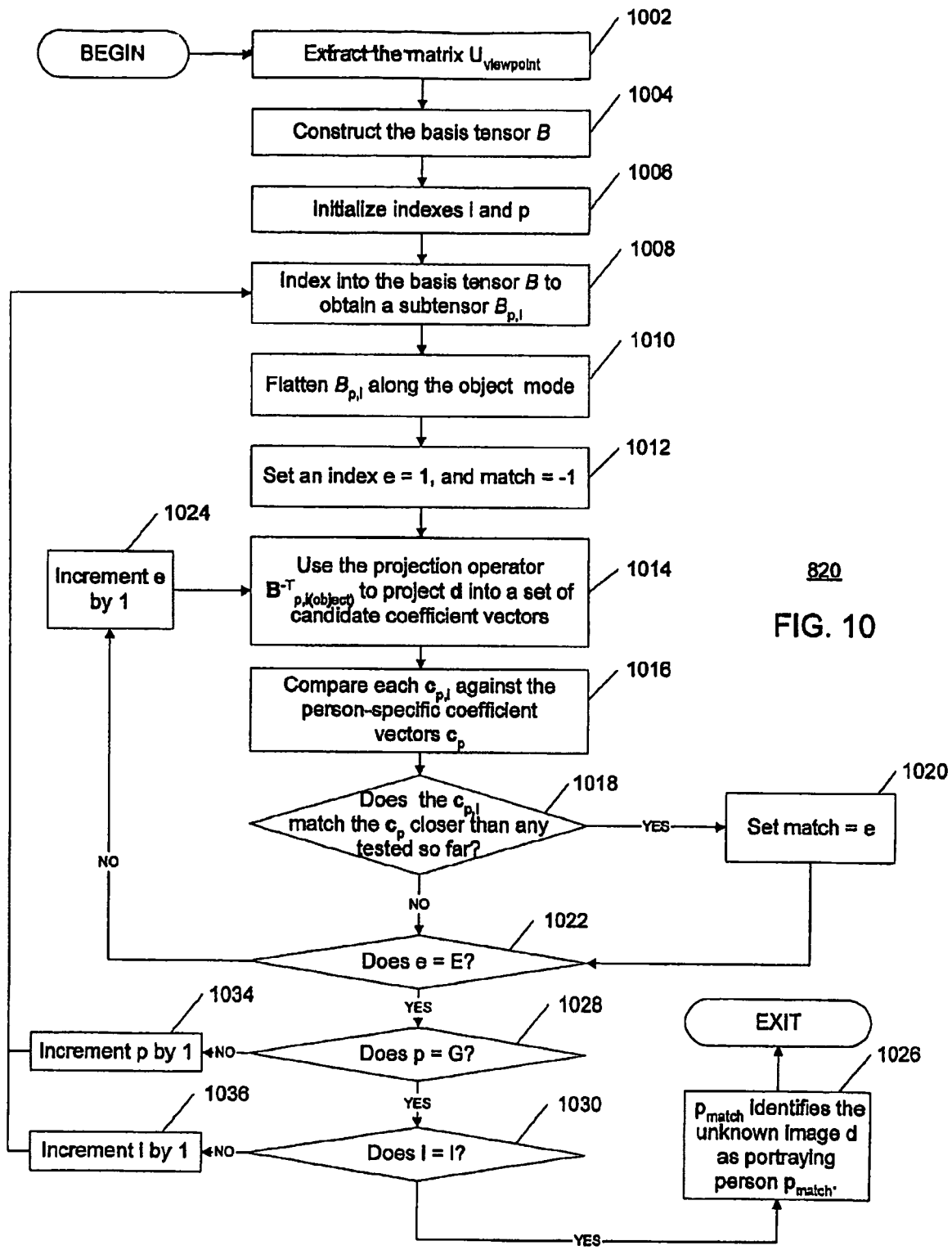
FIG. 10 is a flow diagram of an exemplary embodiment of the viewpoint recognition procedure of the process of FIG. 8 which recognizes of an unidentified viewpoint of a known object.

FIG. 10 illustrates a flow diagram of the details of the viewpoint recognition procedure of step 820 for recognizing an unidentified viewpoint given an unknown image: the new data vector d. The viewpoint recognition procedure of step 820 is largely the same as the object recognition procedure of step 816. The viewpoint recognition procedure of step 820 begins in step 1002, in which the matrix $U_{viewpoints}$ is extracted, in a manner similar to that used to extract $U_{objects}$ in step 902. In particular, the matrix $U_{viewpoints}$ contains row vectors $C_e^T$ of coefficients for each viewpoint e. Once the matrix $U_{viewpoints}$ is extracted, the procedure of step 820 advances to step 1004, in which the basis tensor B is generated. The basis tensor B is constructed according to $B = Z \times_2 U_{illum} \times_1 U_{objects} \times_4 U_{pixels}$. Upon the completion of the construction of the basis tensor B the procedure of step 820 advances to step 1006 where this procedure initializes indexes i and p to one (1). At step 1008, the viewpoint recognition procedure of step 820 indexes into the basis tensor B to obtain a sub-tensor $B_{p,i}$. This is performed for a particular object p and illumination i to obtain the subtensor $B_{p,i}$ having dimensions 1×1×E×P.

Then, in step 1010, the subtensor $B_{p,i}$ is flattened along the viewpoint mode. The subtensor $B_{p,i}$ is flattened along the viewpoint mode to obtain the E×P matrix $B_{p,i(viewpoints)}$. It should be noted that a specific training image $d_d$ of object p in illumination i and viewpoint e can be written as $d_{p,i,e} = B_{p,i(object)}^T c_e$; hence, $c_e = B_{p,i(object)}^{-T} d_{p,i,e}$.

Then, in step 1012, an index variable e and a variable match are initialized. For example, the index variable e is initialized to one (1), and the variable match is initialized to negative one (−1). Once these variables are initialized, the procedure of step 820 advances to step 1014, in which the projection operator $B_{p,i(object)}^T$ is used to project the new data vector d into a set of candidate coefficient vectors. Given the new data vector d, the projection operator $B_{p,i(object)}^T$ is used to project the new data vector d into a set of candidate coefficient vectors $c_{p,i} = B_{p,i(object)}^{-T} d$ for every p, i combination. In step 1016, each of the set of candidate coefficient vectors $c_{p,i}$ is compared against the object-specific coefficient vectors $c_e$. The comparison can be made according to the following equation:

$$\|c_{p,i} - c_e\|.$$

In step 1018, it is determined whether the set of candidate coefficient vectors $c_{p,i}$ is the closest match to the viewpoint coefficient vectors $c_e$ up to this point. The best matching vector $c_e$ can be the one that yields the smallest value of $\|c_{p,i} - c_e\|$ among all illuminations and viewpoints. If the magnitude of the difference between the set of candidate coefficient vectors $c_{p,i}$ and the viewpoint coefficient vectors $c_e$ is smaller than any difference computed up to this point, the procedure of step 820 advances to step 1020. Otherwise, the magnitude of the difference between the set of candidate coefficient vectors $c_{p,i}$ and the procedure of step 820 is forwarded to step 1022. Step 1020 provides that the variable match is set to be equal to the index p. The variable match signifies the index of the most closely matched viewpoint, such that the set of candidate coefficient vectors $c_{p,i}$ most closely matches the viewpoint coefficient vectors $c_{match}$.

Thereafter, in step 1022, it is determined if the index e is equal to E. If that is the case, the procedure of step 820 advances to step 1028; otherwise, the procedure of step 820 advances to step 1024. In step 1024, the index e is incremented by one (1), and the procedure of step 820 advances to step 1014, such that the procedure tests each of the viewpoints in the viewpoint matrix $U_{viewpoints}$ from 1 to E.

In step 1028, it is determined if the index p is equal to G. If that is the case, the procedure of step 820 sets the index p equal to one (1) and advances to step 1030; otherwise, the procedure of step 820 advances to step 1034. In step 1034, the index p is incremented by one (1), and the procedure of step 820 advances to step 1008, such that the procedure tests each of the objects in the object matrix $U_{object}$ from 1 to G.

In step 1030, it is determined if the index i is equal to I. If that is the case, the procedure of step 820 advances to step 1026; otherwise, the procedure of step 820 advances to step 1036. In step 1036, the index i is incremented by one (1), and the procedure of step 820 advances to step 1008, such that the procedure tests each of the illuminations in the illumination matrix $U_{illum}$ from 1 to I. Finally, in step 1026, the object match can be identified as the object portrayed in the new data vector d. In a preferred embodiment of the present invention, the variable match can be an indexed array, that records the indices of multiple objects most closely matching the objects portrayed in the new data vector d. Once the object match is identified, the procedure of step 820 is completed.

Figure 11:
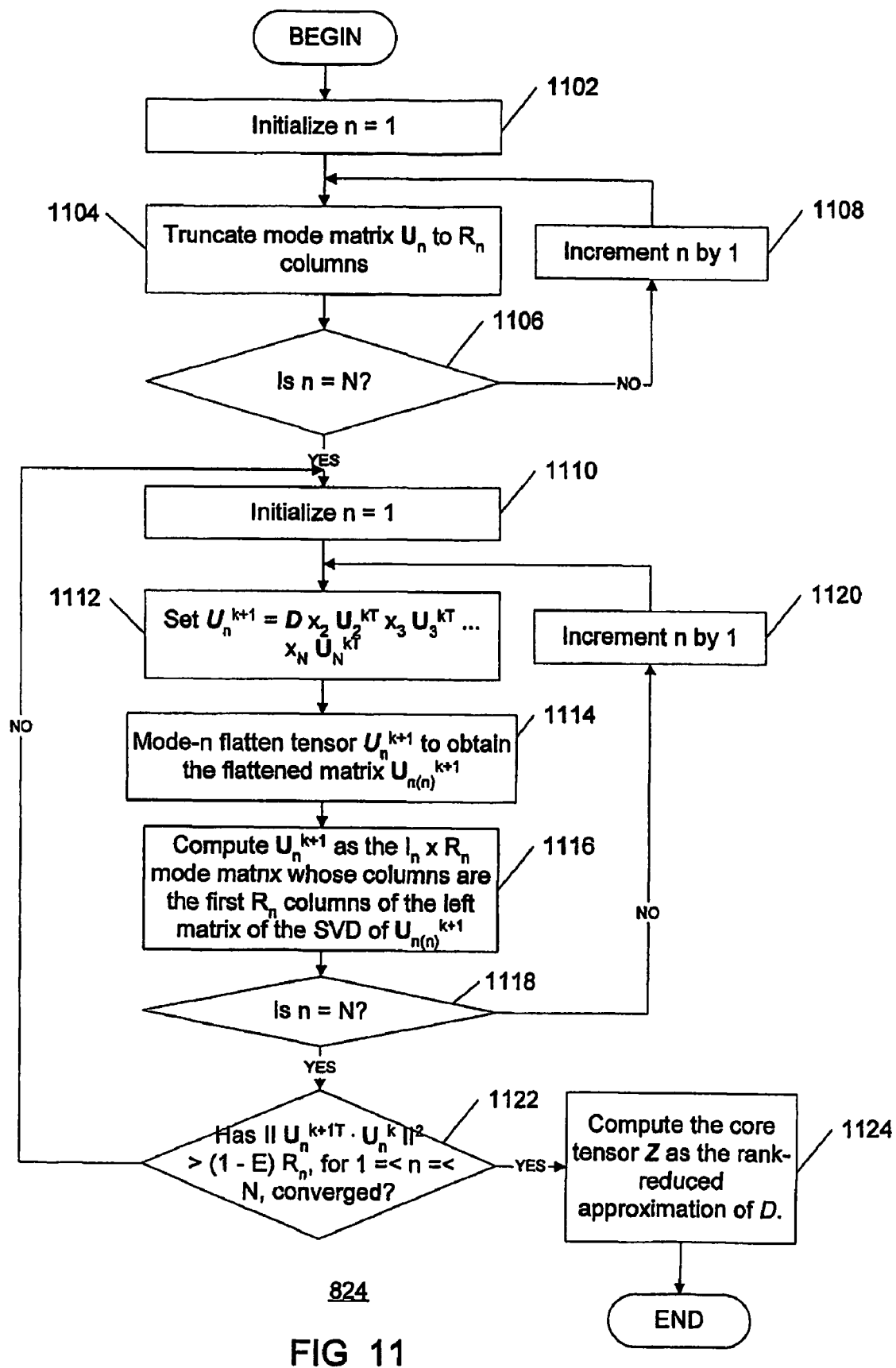
FIG. 11 is a flow diagram of an exemplary embodiment of a data reduction process of the process of FIG. 8 which dimensionally reduces the amount of data describing an object displaying an viewpoint.

FIG. 11 illustrates a flow diagram of the details for the data reduction procedure step 824 for dimensionally reduce the amount of data describing illuminations. This data reduction procedure step 824 reduces the amount of data by truncating the mode matrices resulting from the N-mode SVD procedure 304 or 804, where N=4. The truncation of the mode matrices yields an exemplary reduced-dimensionality approximation D'. The truncation of the mode matrices results in the approximation of the tensor D with reduced ranks $R_1 < I_1, R_2 < I_2, \ldots, R_N < I_N$ that has a bounded error $$\|D - D'\|^2 \leq \sum_{i_1 = R_1+1}^{I_1} \sigma_{i_1}^2 + \cdots + \sum_{i_N = R_N+1}^{I_N} \sigma_{i_N}^2,$$

where the smallest mode-n singular values that were discarded are defined as $\sigma_{i_n = R_n+1}, \sigma_{i_n = R_n+2}, \ldots, \sigma_{i_n = 1_n}$. The $R_n^{th}$ mode-n eigenvalue is the Frobenius norm of the subtensor $Z_{i_1, \ldots, i_n=m, \ldots, i_N}$. The subtensor $Z_{i_1, \ldots, i_n=R_n, \ldots, i_N}$ is extracted from the tensor Z by holding the $n^{th}$ dimension fixed to $i_n=R_n$ and varying all other dimensions. Once the index n is initialized, the procedure step 824 advances to step 1104.

In another exemplary dimensionality reduction procedure for use on the tensors is to compute for a tensor D a best rank-$(R_1, R_2, \ldots, R_N)$ approximation $D'=Z'\times_1 U'_1 \times_2 U'_2 \ldots \times_N U'_N$, with orthonormal $I_n \times R_n$ mode matrices $U'_n$, for $n=1, 2, \ldots, N$, which can minimize the least-squares error function $\|D-D'\|^2$. For example, N can equal to four (4). The data reduction procedure step 824 begins in step 1102, where an index n is initialized to one (1).

In step 1104, the mode matrix $U_n$ is truncated to $R_n$ columns. All data in the mode matrix $U_n$ beyond the $R_n$ column can be removed from the matrix $U_n$. After the matrix $U_n$ is truncated, the procedure step 824 advances to step 1106, in which it is determined whether the index n is equal to N. If that is the case, the procedure step 824 advances to step 1110; otherwise, the procedure step 824 is forwarded to step 1108. In step 1108, the index n is incremented by one (1), and the procedure step 824 proceeds to step 1104. Then, in step 1110, the index n is initialized to one (1), and the procedure step 824 advances to step 1112, in which the tensor is calculated $\tilde{U}_n^{k+1}=D\times_2 U_2^{k^T} \times_3 U_3^{k^T} \ldots \times_N U_N^{k^T}$. When the tensor $U'_n{}^{k+1}$ is calculated, the procedure step 824 advances to step 1114, in which the tensor $U'_n{}^{k+1}$ is mode-n flattened to obtain the matrix $U'_{n(n)}{}^{k+1}$, Then in step 1116, the matrix $U'_1{}^{k+1}$ is computed as the $I_1 \times R_1$ matrix whose columns are the first $R_1$ columns of the left matrix of the SVD of $U'_{1(1)}{}^{k+1}$.

In step 1118, it is determined whether the index n is equal to N. If that is the case, the procedure step 824 advances to step 1122; otherwise the procedure step 824 advances to step 1120, in which the index n is incremented by one (1) and the procedure step 824 advances to step 1112. Then in step 1122, it is determined whether the mode matrices have converged. The mode matrices have converged if $\|U_n^{k+1^T} U_n^k\|^2 > (1-\epsilon)R_n$, for $1 < n < N$. If the mode matrices have converged, the procedure step 824 advances to step 1124; otherwise the procedure step 824 advances to step 1110. In step 1124, the core tensor Z' is computed. The converged mode matrices $U'_1, U'_2, \ldots, U'_N$ is used to compute the core tensor $Z'=U'^N \times_N U'_N{}^T$ and $D'=Z' \times_1 U'_1 \times_2 U'_2 \ldots \times_N U'_N$ as the rank-reduced approximation of the tensor D. Once the core tensor Z' is computed, the procedure step 824 is completed.

C. Image Signature Using a Matrix Representation of a Corpus of Data

Figure 13:
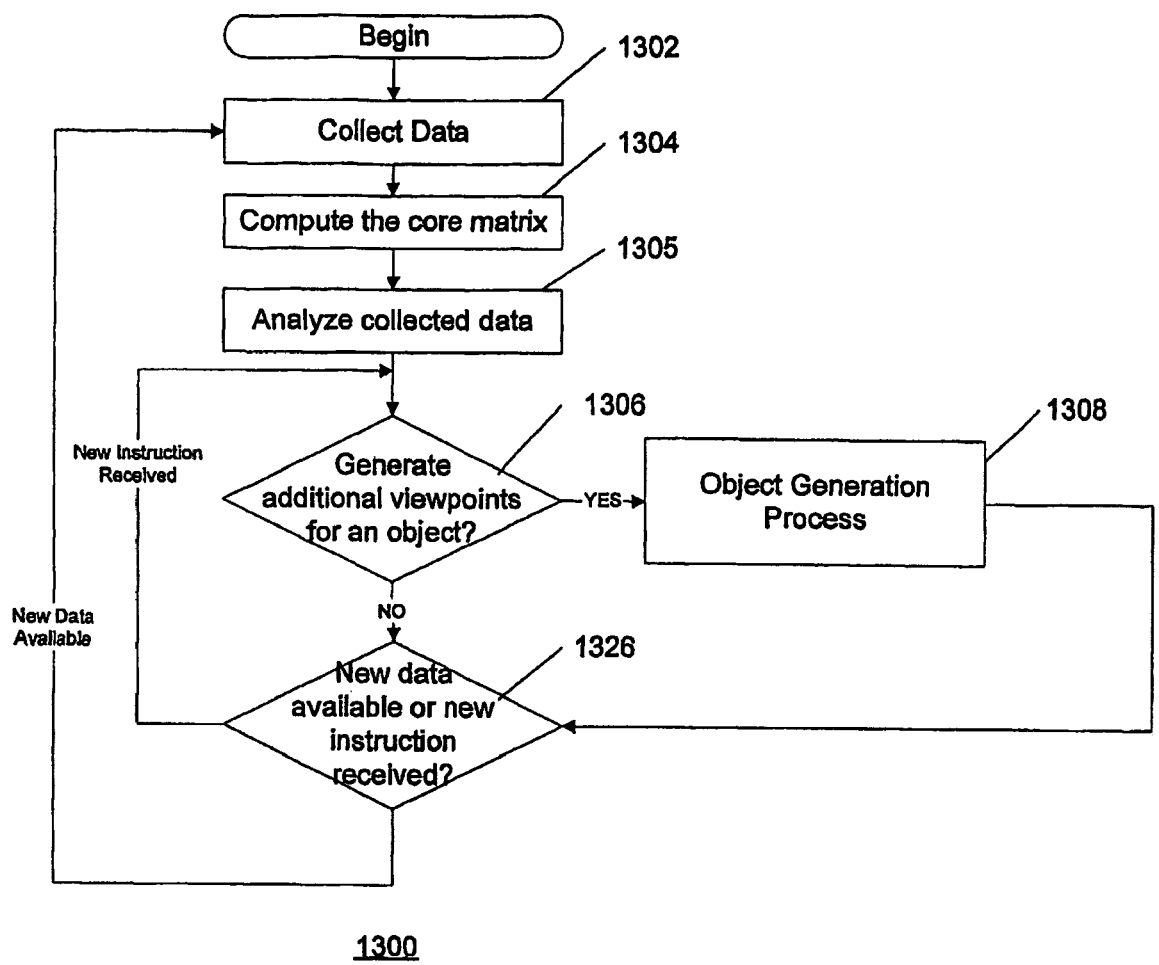
FIG. 13 is a flow diagram of another exemplary embodiment of a process according to the present invention which analyzes multilinear data.

FIG. 13 illustrates a flow diagram of an exemplary embodiment of a process implementing a multilinear data analysis application 1300 which is indicative of the multilinear data analysis application. As described above for the multilinear data analysis application, the process 1300 is configured to synthesize a known viewpoint never before recorded of the object. In particular the multilinear data analysis application utilizes the corpus of viewpoint data, which is collected using the data capturing system 112 from different objects as described above in relation to FIG. 2. This corpus of image information is stored in the database 108 of the server 102, and describes illumination of at least one object from at least one viewpoint. The corpus of image information can be organized as a matrix D and is preferably collected from different objects as described above in relation to FIG. 2. It should be understood that the corpus of image information can also be organized as a tensor D or a vector d. The multilinear data analysis application 1300 is similar to the multilinear data analysis application 200 of FIG. 2, except that the data utilized by the multilinear data analysis application 1300 takes is organized as the matrix D, not as the tensor D.

Turning to further particulars of FIG. 13, in step 1302, the process 1300 collects image information or data on various objects from different viewpoints, e.g., new image data. If the viewpoint and object are known, the data can be integrated into the matrix D. If the viewpoint or object are not known, such data would likely not be integrated into the matrix D until those pieces of information are determined. The data describing an unknown viewpoint or object is organized as a new data matrix $D_p$ or a new data vector d. The new data matrix $D_p$ can include more than one new data vector d. Each new data vector $d_{p,a}$ of the new data matrix $D_p$ describes the image of object p performing viewpoint a. With the knowledge of image sequences of several objects, the matrix D can take the form of a ntxm matrix, where n is the number of objects, t is the number of image samples, and m is the number of viewpoints. The first column of the matrix D stacks the mean first viewpoint of every object, the second column stacks the mean second viewpoint of every object and the third stacks the mean third viewpoint of every object, as follows:

$$D = \begin{bmatrix} D_1 \\ \vdots \\ D_i \\ \vdots \\ D_n \end{bmatrix}$$

$$D_i = \begin{bmatrix} \vec{viewpoint1}_i & \vec{viewpoint2}_i & \vec{viewpoint3}_i \end{bmatrix}$$

The columns of the matrix $D_i$ are the average first viewpoint, second viewpoint and third viewpoint of the $i^{th}$ object. Each image is defined as the illumination of each pixel.

At step 1304, the process 1300 decomposes the matrix D into a core matrix Z, an object matrix P, and a viewpoint matrix A. The core matrix Z can be used for defining the inter-relationships between an objects matrix P and a viewpoint matrix A. This step represents a singular value decomposition ("SVD") process 1304, shown in FIG. 14, and described in further detail herein. The SVD procedure of step 1304 is an orthonormal procedure that solves for the core matrix Z, the object matrix P, and the viewpoint matrix A, which minimizes $$E = \|D - (Z^{1/T} P^T)^{VT} A^T\| + \lambda_1 \|P^T P - I\| + \lambda_2 \|A^T A - I\|,$$

where I is the identity matrix. When this procedure of step 1304 determines the core matrix Z, the process 1300 advances to step 1305.

In step 1305, the process 1300 analyzes the data collected in the step 1302. The SVD procedure of step 1304 decomposes the matrix D into the product of a core matrix Z, and two orthogonal matrices as follows:

$$D = (Z^{VT}P^T)^{VT} A^T$$
$$= S\ A^T,$$

where the VT-operator is a matrix transpose T followed by a "vec" operator that creates a vector by stacking the columns of the matrix. The object matrix $P=[p_1 \ldots p_n \ldots p_G]^T$, whose row vectors $p_i$ are object specific, encodes the invariancies across viewpoints for each object. Thus, the object matrix P contains the object or human image signatures $p_i$. The viewpoint matrix $$A = \begin{bmatrix} \vdots & \vdots & \vdots \\ a_{walk} & a_{ascend} & a_{descend} \end{bmatrix}^T$$

whose row vectors $a_c$, contain the coefficients for the different viewpoint classes c, encodes the invariancies across objects for each viewpoint. The core matrix $Z=[Z_1 \ldots Z_i \ldots Z_n]^T$ represents the basis images which are independent of objects and of viewpoints. It governs the relationship between the orthonormal matrices P and A. A matrix $$S=(Z^{VT}P^T)^{VT}=[S_1 \ldots S_i \ldots S_n]^T$$

is composed of object-specific signature matrices S.

In step 1306, the process 1300 determines whether it has been instructed by the client interface application to synthesize new data describing at least one known viewpoint that was never before recorded of an object. If the process 1300 has received such instruction, step 1308 is executed to perform advances to an object generation procedure, as shown in further detail in FIG. 15 and described herein. When the object generation procedure of step 1308 is complete, the process 1300 advances to step 1326. Then in step 1326, the process 1300 determines whether a data set for a new object should be integrated into the matrix D or if the client interface application has transmitted a new instruction. In particular, if the data set for a new object from the viewpoint is available, the process 1300 advances to step 1302. Otherwise, the process 1300 received the new instruction from the client interface application, so the process 1300 continues to step 1306.

Figure 14:
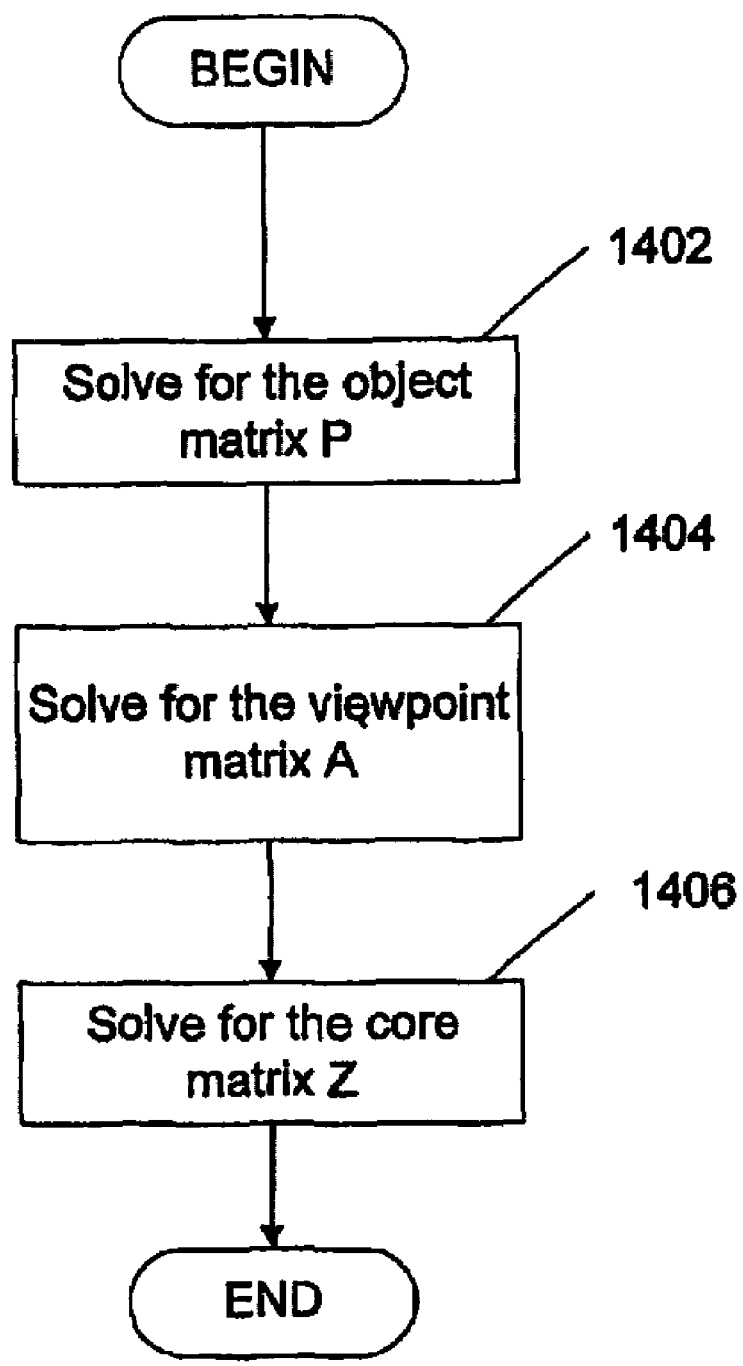
FIG. 14 is a flow diagram of an exemplary embodiment of a core matrix computation procedure of the process of FIG. 13 which performs an SVD matrix algorithm for decomposing a matrix.

As shown in FIG. 14, the procedure of step 1304 begins in step 1402 by computing the matrix P by solving $D=(Z^{VT}P^T)^{VT}A^T$. The process then calculates $(DA)^{VT}=Z^{VT}P^T$. The procedure performs an SVD procedure on the left hand side resulting in $USV^T=Z^{VT}P^T$. The matrix V is then truncated to the first r-columns of the matrix V. The procedure of step 1304 then solves for the viewpoint matrix A in step 1404 by calculating $D^{VT}=(ZA^T)^{VT}P^T$. Once this is calculated, the procedure calculates $(D^{VT}P)^{VT}=ZA^T$. The procedure performs SVD on the left hand side resulting in $USV^T=ZA^T$. The matrix A is then truncated to the first r-columns of the matrix V. In step 1406, the procedure of step 1304 obtains the core matrix Z by $Z=(D^{VT}P)^{VT}A$, where the matrix P and the matrix A are orthonormal. It should be understood that by setting the matrix A and the matrix P to the first r-columns of the matrix V, effectively accomplishing dimensional reduction.

Figure 15:
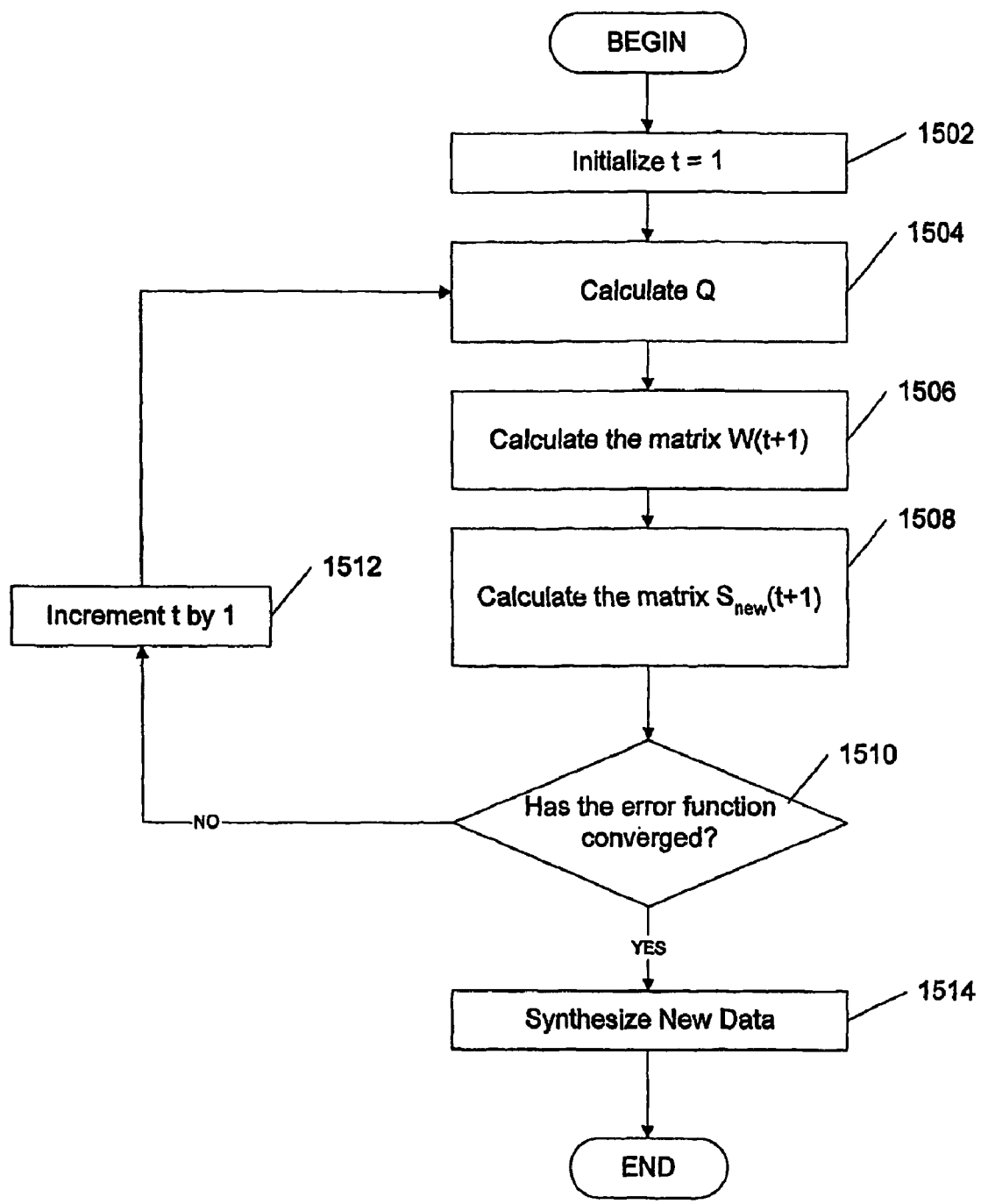
FIG. 15 is a flow diagram of an exemplary embodiment of a process of FIG. 13 which synthesizes the remaining viewpoints for a new object.

FIG. 15 illustrates the details of the object generation procedure of step 1308, which synthesizes the remaining viewpoints, which were never before seen, for an new object. The remaining viewpoints are generated given new image data $D_{new}$ of the new object observed from a viewpoint. The new signature model of the new object is the matrix $$D_{new}[?|]\underbrace{[?]}_{S_{new}}A^T.$$

Only a portion of the viewpoint classes c are represented the matrix $D_{new}$. The linear combination of known signatures is:

$$S_{new} = \underbrace{[W_l \ldots W_i \ldots W_n]}_{W} \begin{bmatrix} S_l \\ \vdots \\ S_i \\ \vdots \\ S_n \end{bmatrix}_{S}$$

where W is a weight matrix. The object generation procedure of step 1308 solves for the weight matrix W of the new object using iterative gradient descent of the error function $$E=\|D_{new} - WSA_{inc}^T\|,$$

where $A_{inc}^T$ has only columns corresponding to the image examples available in the matrix $D_{new}$. In particular, step 1502 of this procedure initializes an index t to one (1). In step 1504, the procedure of step 1308 obtains the matrix Q by calculating $Q=SA_{inc}^T$. Once this procedure obtains the matrix Q, step 1506 of the procedure of step 1308 calculates the matrix W(t+1) in the following manner: $W(t+1)=W(t)+\gamma (D_{new}-WQ)Q^T$. The step 1508 then calculates $S_{new}(t+1)$ by calculating $S_{new}(t+1)=W(t+1)S$, then this procedure advances to step 1510.

In step 1510, it is determined whether the error function E has converged. If the error function E has not converged, the procedure of step 1308 continues to step 1512, where the index t is incremented by one (1) and this procedure advances to step 1504. If the error function E has converged, this procedure advances to step 1514. In step 1514 the procedure of step 1308 synthesizes new data from one of the viewpoint parameters c. For example, if the viewpoint parameter c represents the first viewpoint. The new data for the first viewpoint is synthesized by multiplying the newly extracted signature matrix $S_{new}$ and the viewpoint parameters for the first viewpoint, $a_{viewpoint1}$, as follows:

$$\overline{viewpoint1}_{new} = S_{new}\vec{a}_{viewpoint1}.$$

Once the new data is synthesized, the procedure of step 1308 is complete and it exits.

Another exemplary embodiment of the present invention includes a tensor framework for image-based rendering. In particular, this exemplary embodiment may learn a parsimonious model of a bidirectional texture function (BTF) from observational data. Such learning may be accomplished, for example, through a "TensorTextures" operation. Given an ensemble of images of a textured surface, the embodiment may comprise and/or generate a nonlinear, generative model explicitly representing the multifactor interaction implicit in the detailed appearance of the surface under varying photometric angles, including local (per-texel) reflectance, complex mesostructural self-occlusion, interreflection and self-shadowing, and other BTF-relevant phenomena. Mathematically, the TensorTextures operation may be based on multilinear algebra (i.e., the algebra of higher-order tensors. It may be computed through a decomposition known as the N-mode singular value decomposition (SVD), an extension to tensors of a matrix singular value decomposition. This exemplary embodiment, as well as the TensorTextures exemplary operation, may be applied to the image-based rendering of natural and synthetic textured surfaces under continuously varying viewpoint and illumination conditions, as well as other image-based operations.

This exemplary embodiment, and the TensorTextures exemplary operation employed thereby, may be considered an image-based technique for rendering textured surfaces from sparsely sampled BTF data. More specifically, from an ensemble of sample images of a textured surface, this exemplary embodiment may employ an offline analysis stage to generate or learn a generative model accurately approximating the BTF. Then, in an online synthesis stage, the learnt generative model may facilitate rendering the appearance of the textured surface under arbitrary view and illumination conditions. (Alternately, the view and illumination conditions may be chosen or selected by an operator.)

Figure 16:
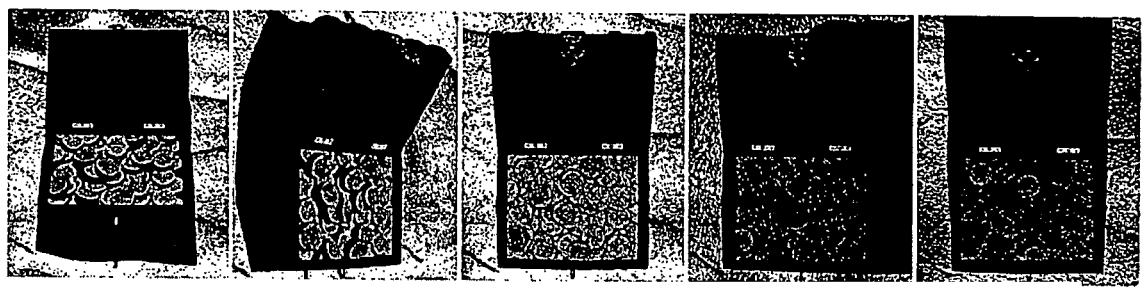
FIG. 16 depicts a set of frames from an exemplary animation, containing a TensorTexture mapped onto a planar surface.

FIG. 16 shows an exemplary texture generated by this exemplary embodiment. Although the coins in the treasure chest appear to have considerable three-dimensional relief as the view and illumination directions vary, this is in fact a texture mapped onto a perfectly planar surface. This exemplary embodiment, through the TensorTextures exemplary operation, has learned a compact representation of the variation in appearance of the surface under changes in viewpoint and illumination, including complex details due to surface mesostructure, such as self-occlusion, interreflection, and self-shadowing. Unlike typical BTF synthesis methods and similar algorithms, this exemplary embodiment employs an image-based methodology, thus avoiding the issue of estimating three-dimensional geometric mesostructures and/or macrostructures from the image data.

Unlike many previous methods, this exemplary embodiment uses a nonlinear BTF model during the TensorTextures operation. Mathematically, TensorTextures exemplary technique may be based on a multilinear (i.e., tensor) algebra approach to the analysis of image ensembles. In this exemplary embodiment, a multilinear theory is applied in the context of computer graphics. TensorTextures exemplary technique may be regarded as an instantiation of a novel, multilinear framework for image-based rendering. A major technical advantage of this exemplary embodiment is that the underlying tensor formulation can disentangle and explicitly represent each of the multiple factors inherent to image formation. This stands in contrast to principal components analysis (PCA), a linear (i.e., matrix) model typically computed using the singular value decomposition (SVD), which has so far been the standard BTF representation/compression method. PCA is, in fact, subsumed by this exemplary embodiment's multilinear framework. A major limitation of PCA is that it captures the overall variation in the image ensemble without explicitly distinguishing what proportion is attributable to each of the relevant factors—illumination change, viewpoint change, etc. This exemplary embodiment prescribes a more sophisticated tensor decomposition that may further analyze this overall variation into individually encoded constituent factors using a set of basis functions.

However, the so-called "tensor SVD" may not necessarily provide all the mathematical properties of the matrix SVD. Further, there are several ways to decompose tensors. For example, one may employ a compression method that expresses sampled BTF data as a linear combination of lower-rank tensors, but such an approach may be inadequate as a possible generalization of PCA.

Through methodologies adapting multilinear algebra (the algebra of higher order tensors), this exemplary embodiment contributes a multimodal model with which to address BTF modeling/rendering. This exemplary embodiment may determine a model through a tensor decomposition known as the N-mode SVD, which may be regarded as an extension to tensors of the conventional matrix SVD.

This exemplary embodiment generally may determine and decompose an n-mode tensor (and, optionally, dimensionally reduce the tensor) in order to perform image-based rendering. During such a process, the embodiment may perform any or all of the following operations.

Figure 17:
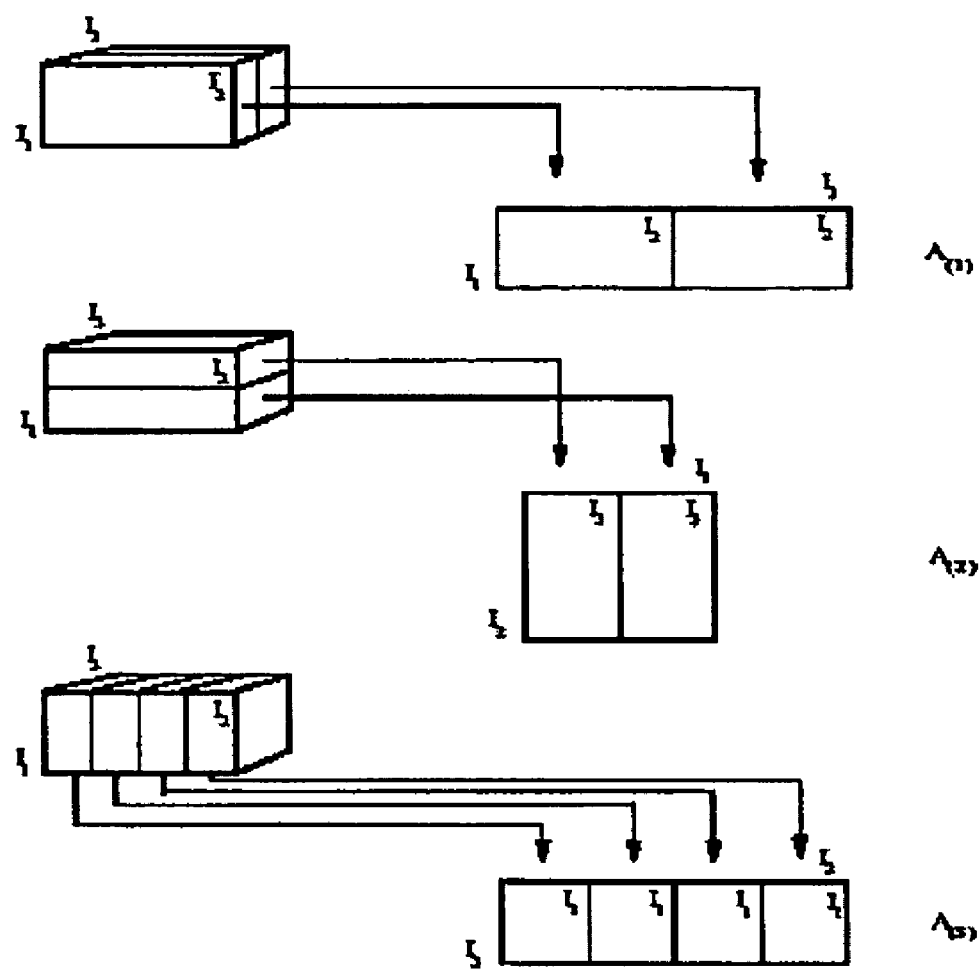
FIG. 17 is flattening a ($3^{rd}$-order) tensor.

Generally speaking, a tensor is a higher order generalization of a vector ($1^{st}$-order tensor) and a matrix ($2^{nd}$-order tensor). Tensors are multilinear mappings over a set of vector spaces. The order of tensor $A \in \mathrm{IR}^{I_1 \times I_2 \times \cdots \times I_N}$ is N. (One may generally denote scalars by lower case letters (a, b, . . . ), vectors by bold lower case letters (a, b, . . . ), matrices by bold upper-case letters (A, B, . . . ), and higher-order tensors by calligraphic upper-case letters (A, B . . . ).) An element of A may be denoted as $a_{i_1 \ldots i_n \ldots i_N}$, where $1 \leq i_n \leq I_n$. In tensor terminology, column vectors are referred to as mode-1 vectors and row vectors as mode-2 vectors. The mode-n vectors are the column vectors of matrix $A_{(n)} \in \mathrm{IR}^{I_n \times (I_1 I_2 \ldots I_{n-1} I_{n+1} \ldots I_N)}$ that results from flattening the tensor A, as illustrated in FIG. 17.

The mode-n product of a tensor $A \in \mathrm{IR}^{I_1 \times I_2 \times \cdots \times I_n \times \cdots \times I_N}$ and a matrix $M \in \mathrm{IR}^{J_n \times I_n}$ is denoted by $A \times_n M$. Its result is a tensor $B \in \mathrm{IR}^{I_1 \times \cdots \times I_{n-1} \times J_n \times I_{n+1} \times \cdots \times I_N}$ whose entries are $b_{i_1 \ldots i_{n-1} j_n i_{n+1} \ldots i_N} = \sum_{i_n} a_{i_1 \ldots i_{n-1} i_n i_{n+1} \ldots i_N} m_{j_n i_n}$. It should be noted that the mode-n product of a tensor and a matrix is a special case of the inner product in multilinear algebra and tensor analysis. For tensors and matrices of the appropriate sizes, $A \times_m U \times_n V = A \times_n V \times_m U$ and $(A \times_n U) \times_n V = A \times_n (VU)$. The mode-n product can be expressed in terms of flattened matrices as $B_{(n)} = M A_{(n)}$. One example of flattening a third-order tensor is shown in FIG. 17. The tensor can be flattened in three ways to obtain matrices comprising its mode-1, mode-2, and mode-3 vectors.

Similarly, a matrix $D \in \mathrm{IR}^{I_1 \times I_2}$ is a two-mode mathematical object with two associated vector spaces, a row space and a column space. A SVD approach orthogonalizes these two spaces and decomposes the matrix as $D = U_1 S U_2^T$, the product of an orthogonal column-space represented by the left matrix $U_1 \in \mathrm{IR}^{I_1 \times J_1}$, a diagonal singular value matrix $S \in \mathrm{IR}^{J_1 \times J_2}$, and an orthogonal row space represented by the right matrix $U_2 \in \mathrm{IR}^{I_2 \times J_2}$. This exemplary matrix product can be rewritten in terms of mode-n products as $D = S \times_1 U_1 \times_2 U_2$.

Figure 18:
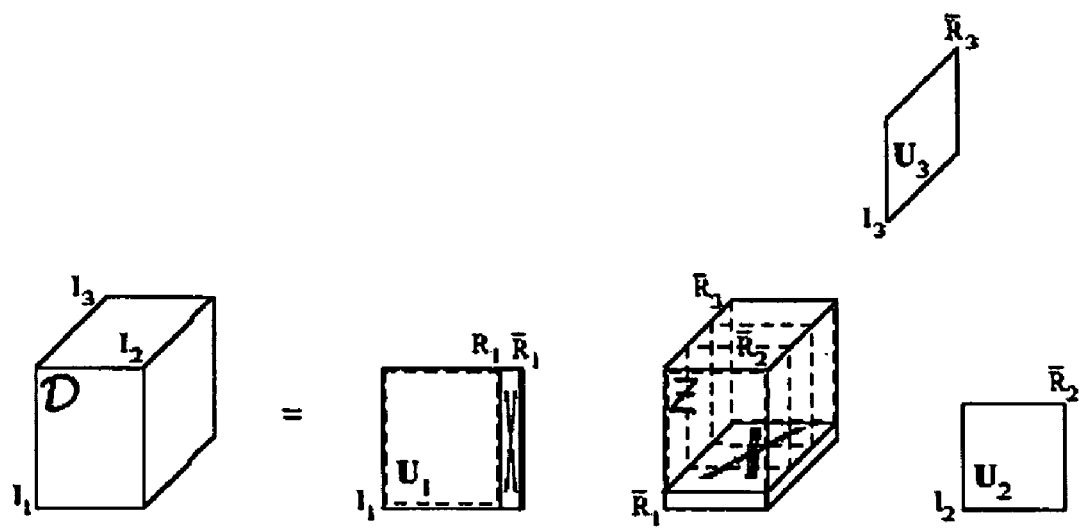
FIG. 18 is three-mode tensor decomposition and dimensionality reduction through truncation.

By extension, an order N>2 tensor D is an N-dimensional array with N associated vector spaces. The N-mode SVD is a generalization of the SVD that orthogonalizes these N spaces and decomposes the tensor as the mode-n product of the N orthogonal spaces, $$D = Z \times_1 U_1 \times_2 U_2 \ldots \times_n U_n \ldots \times_n U_N, \quad (1)$$

as illustrated in FIG. 18 for the case N=3. Tensor Z, known as the core tensor, is analogous to the diagonal singular value matrix in conventional matrix SVD. It should be realized, however, that the core tensor does not have a diagonal structure; rather, Z is in general a full tensor. The core tensor governs the interaction between the mode matrices $U_n$ for $n=1, \ldots, N$. Mode matrix $U_n$ contains the orthonormal vectors spanning the column space of the matrix $D_{(n)}$ that results from the mode-n flattening of D, as was illustrated in FIG. 17.

One N-mode SVD algorithm for decomposing D according to the above equation may be performed by the embodiment in the following two steps.

1. For $n=1, \ldots, N$, compute matrix $U_n$ in (1) by computing the SVD of the flattened matrix $D_{(n)}$ and setting $U_n$ to be the left matrix of the SVD. For a non-square, m×n matrix A, the matrix U in the SVD $A=USV^T$ may be computed efficiently, depending on which dimension of A is smaller, by decomposing either the m×n matrix $AA^T=US^2U^T$ and then computing $V_T^T=S^+U^T A$ or by decomposing the n×n matrix $A^T A=VS^2V^T$ and then computing $U=AVS^+$, where the "+" superscript denotes the pseudoinverse.

FIG. 18 generally depicts three-mode tensor decomposition and dimensionality reduction through truncation. The data tensore D can be decomposed into the product of a core tensor Z and N mode matrices $U_1 \ldots U_N$; for the N=3 illustrated here, $D=Z \times_1 U_1 \times_2 U_2 \times_3 U_3$. Deletion of the last mode-1 eigenvector of $U_1$ incurs an approximation error equal to $$\sigma_{R_1}^2,$$

which equals the Frobenius norm of the (grey) subtensor of $Z_{i_1=R_1}$.

2. If it is needed, the core tensor may be determined as follows:

$$Z = D \times_1 U_1^T \times_2 U_2^T \ldots \times_n U_n^T \ldots \times_N U_N^T \qquad (2)$$

Dimensionality reduction may be useful for data compression in image based rendering. Optimal dimensionality reduction in matrix PCA results from the truncation of eigenvectors associated with the smallest singular values in the SVD. Multilinear analysis admits an analogous dimensionality reduction scheme, but it offers much greater control, enabling a tailored truncation of each mode in accordance with the importance of the mode to the rendering task.

A truncation of the mode matrices of the data tensor D results in an approximation $\hat{D}$ with reduced ranks $R_1 \leq \bar{R}_1$, $R_2 \leq \bar{R}_2, \ldots, R_N \leq \bar{R}_N$, where $\bar{R}_n = \text{rank}_n(D) = \text{rank}(D_{(n)}) = $ rank ($U_n$) is the n-rank of D for $1 < n < N$. The error of this approximation is $$\|D - \hat{D}\|2 = \sum_{i_1=R_1+1}^{\bar{R}_1} \ldots \sum_{i_N=R_N+1}^{\bar{R}_N} Z_{i_1 i_2 \ldots i_N}^1 \qquad (3)$$

$$\leq \sum_{i_1=R_1+1}^{\bar{R}_1} \sigma_{i_1}^2 + \ldots + \sum_{i_N=R_N+1}^{\bar{R}_N} \sigma_{i_N}^2; \qquad (4)$$

that is, it is bounded by the sum of squared singular values associated with the discarded singular vectors, where the singular value associated with the $m^{th}$ singular vector in mode matrix $U_n$ is equal to the Frobenius norm $\|Z_{i_n=m}\|$ of subtensor $Z_{i_n=m}$ of the core tensor Z (FIG. 18). The truncated mode matrix is denoted $\hat{U}_n$.

Computing the optimal dimensionality reduction may not generally be straightforward in multilinear analysis. A truncation of the mode matrices that result from the N-mode SVD algorithm yields a reasonably good reduced-dimensionality approximation $\hat{D}$, but it is generally not optimal. Certain prior art solutions may employ an iterative, alternating least squares (ALS) algorithm that improves the mode matrices $\hat{U}_n$ and hence $\hat{D}$, although this may not guarantee a globally optimal result.

Figure 19:
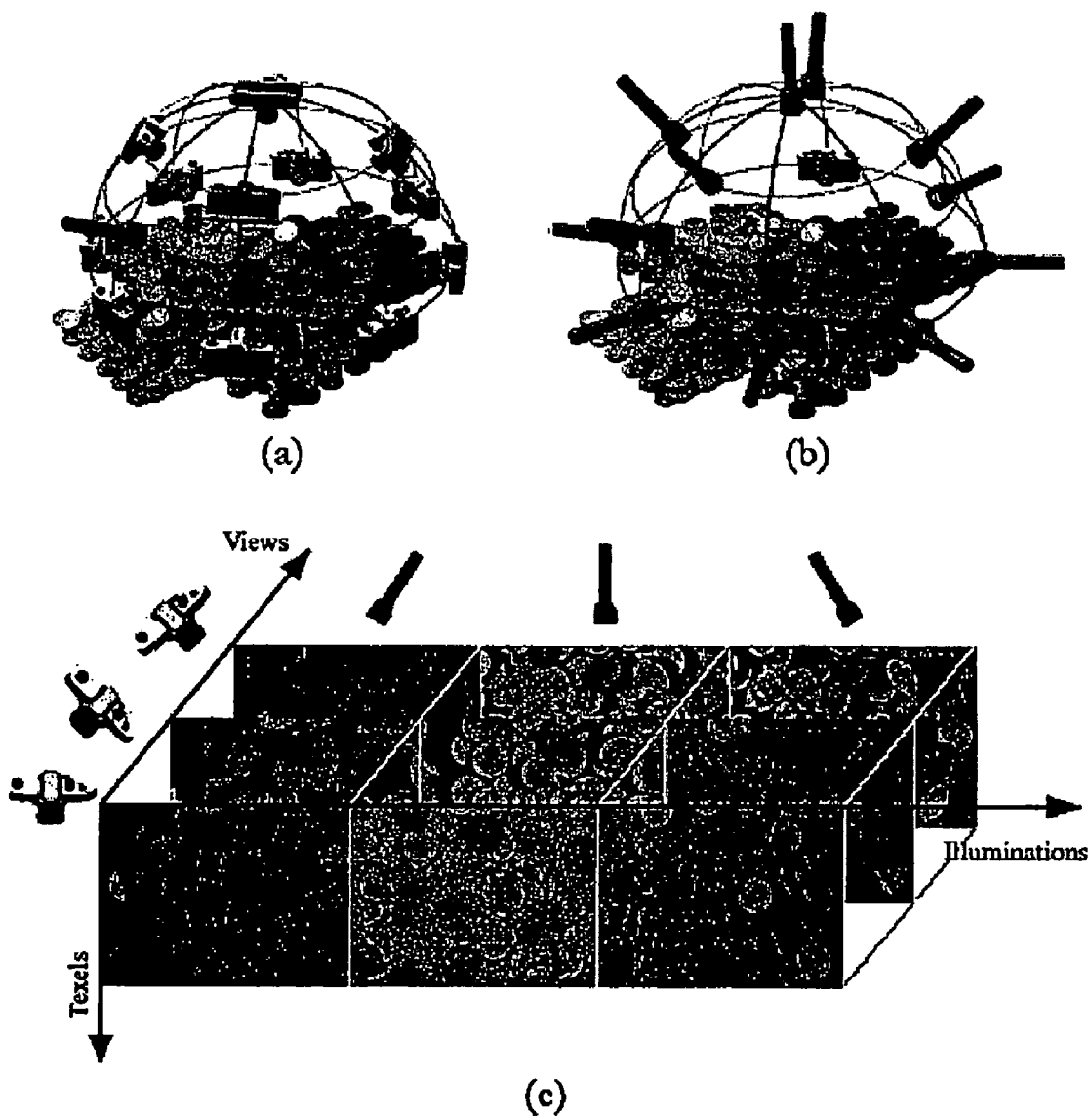
FIG. 19 is image acquisition and representation

FIG. 19 generally depicts image acquisition and representation. Images may be acquired from several different view directions over the viewing hemisphere (a) and, for each viewpoint, under several different illumination conditions over the illumination hemisphere (b). The ensemble of acquired images may be organized by the embodiment in a third-order tensor (c) with view, illumination, and texel modes. Although the contents of the texel mode are vectors of RGB texel values, for clarity they are displayed as 2D images in this and subsequent figures.

Given an ensemble of images of a textured surface, an image data tensor $D \in \mathbb{R}^{T \times I \times V}$ may be defined by the embodiment, where V and I are, respectively, the number of different viewing conditions and illumination conditions associated with the image acquisition process, and T is the number of texels in each texture image. As a concrete example, which will be used herein for illustrative purposes, consider the synthetic scene of scattered coins shown in FIG. 19. In this example, a total of 777 sample RGB images of the scene are acquired from V=37 different view directions over the viewing hemisphere (FIG. 19(a)), each of which is illuminated by a light source oriented in I=21 different directions over the illumination hemisphere (FIG. 19(b)). The size of each image is T=240×320×3=230400. Images acquired from an oblique viewing angle may be rectified with respect to the frontal image acquired from the top of the viewing hemisphere.

This exemplary embodiment may organize the rectified images as a $3^{rd}$-order tensor $D \in \mathbb{R}^{230400 \times 21 \times 37}$, a portion of which is shown in FIG. 19(c). In principle, the N-mode SVD algorithm from Section 2 may be applied to decompose this tensor as follows:

$$D = Z \times_1 U_{texel} \times_2 U_{illum} \times_3 U_{view}, \qquad (5)$$

into the product of three orthonormal mode matrices and a core tensor Z that governs the interaction between the different modes. The mode matrices encode the second-order statistics of each of the factors. The column vectors of the 37×37 mode matrix $U_{view}$ span the view space. The rows of $U_{view}$ encode an illumination and texel invariant representation for each of the different views. The column vectors of the 21×21 mode matrix $U_{illum}$ span the illumination space. The rows of $U_{illum}$ encode a view and texel invariant representations for each of the different illuminations. The first coordinates of the row vectors of $U_{view}$ ($U_{illum}$) encode the directions on the viewing (illumination) hemisphere associated with the acquired images. This information is not provided explicitly; it is learned by the decomposition from the image ensemble.

Figure 20:
FIG. 20 is a matrix $U_{texel}$ containing the PCA eigenvectors, which are the principal axes of variation across all images.

FIG. 20 shows the column vectors of the 230400×777 mode matrix $U_{texel}$, which span the texel space and are the PCA eigenvectors (i.e., "eigenimages" or "eigentextures"), since they were computed by the embodiment performing an SVD on the matrix $D_{(texel)}$ obtained by mode-3 flattening the data tensor D. Hence, the embodiment's multilinear analysis subsumes PCA.

Figure 21:
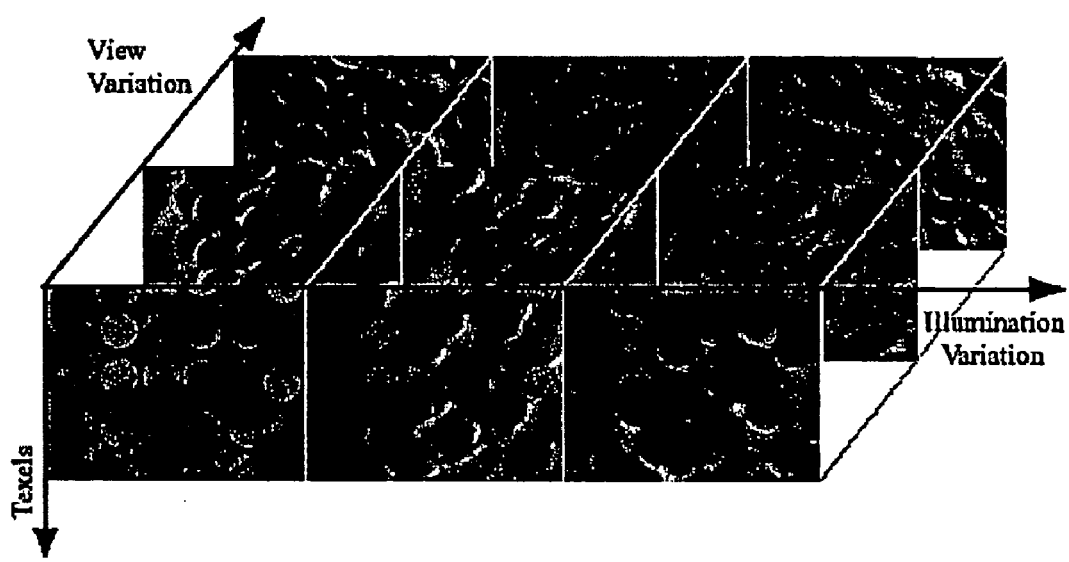
FIG. 21 is a partial visualization of the 37×21 Tensor-Textures bases of the coins image ensemble.

FIG. 21 depicts a partial visualization of the 37×21 TensorTextures bases of the coins image ensemble.

This exemplary embodiment may employ the TensorTextures operation to model how the appearance of a textured surface varies with view and illumination. The TensorTextures representation (such as the one shown in FIG. 21) is the product $$T = Z \times_1 U_{texel}; \text{ or} \qquad (6)$$

$$= D \times_2 U_{illum}^T \times_3 U_{veiw}^T, \qquad (7)$$

Generally, the second equation is used by the embodiment to compute the TensorTextures representation, since it prescribes computation of the relatively small matrices $U_{view}$ and $U_{illum}$ rather than the generally large matrix $U_{texel}$ that would be computed with PCA. Thus, the embodiment, through the TensorTextures operation, may transform eigentextures into a tensorial representation of the variation and co-variation of modes (such as view and illumination). The embodiment may characterize how viewing parameters and illumination parameters interact and multiplicatively modulate the appearance of a surface under variation in view direction ($\theta_v$, $\phi_v$), illumination direction ($\theta_i$, $\phi_i$), and position (x, y) over the surface.

Figure 22:
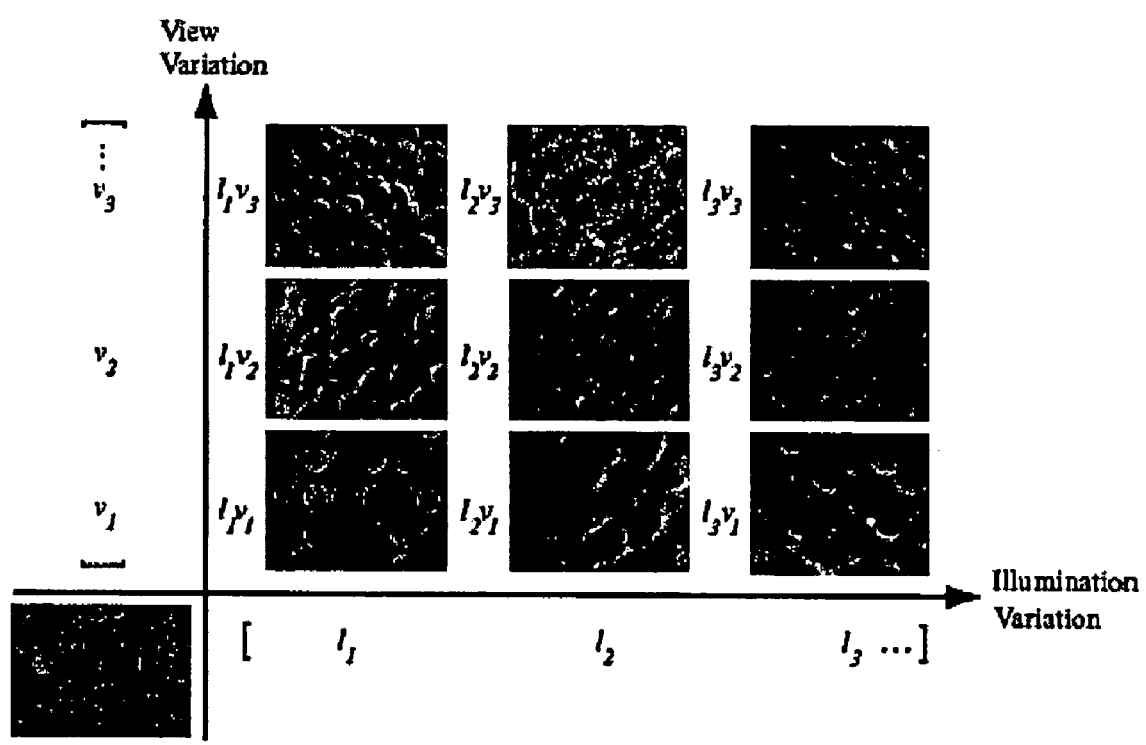
FIG. 22 is the lower left image rendered by multiplicatively modulating each of the basis vectors (generated by the TensorTextures operation) with the coefficients in the view coefficient vector v and the illumination coefficient vector 1.

The TensorTextures exemplary operation may yield a more compact representation than PCA. In the previous example, PCA would decompose the image ensemble into 777 basis vectors (eigentextures), each of dimension 230400, and represent each image by a coefficient vector of length 777, which specifies what proportion of each basis vector to accumulate in order to obtain that image. By contrast, the TensorTextures operation (and thus the embodiment) may decompose the image ensemble into 37×21 basis vectors of the same dimension, and represents each image by two coefficient vectors, one of length 37 to encode the view and the other of length 21 to encode the illumination. Thus, each image would be represented by 37+21=58 coefficients. FIG. 22 shows how these coefficients multiplicatively modulate the TensorTextures basis vectors in order to approximate (or render) an image. FIG. 22 depicts the lower left image rendered by multiplicatively modulating each of the basis vectors (generated by the TensorTextures operation) with the coefficients in the view coefficient vector v and the illumination coefficient vector 1.

Additionally, the exemplary embodiment's multilinear analysis may enable a strategic dimensionality reduction, which is a mode-specific version of the conventional linear dimensionality reduction of PCA. In particular, the embodiment may truncate the mode matrices $U_{view}$ and $U_{illum}$ to obtain $\hat{U}_{view}$ and $\hat{U}_{illum}$, and apply the aforementioned iterative ALS algorithm until convergence in order to improve these truncated mode matrices. Whereas dimensionality reduction in PCA results in unpredictable image degradation, multilinear models yield image degradation that can be controlled independently in viewing and illumination.

Figure 23:
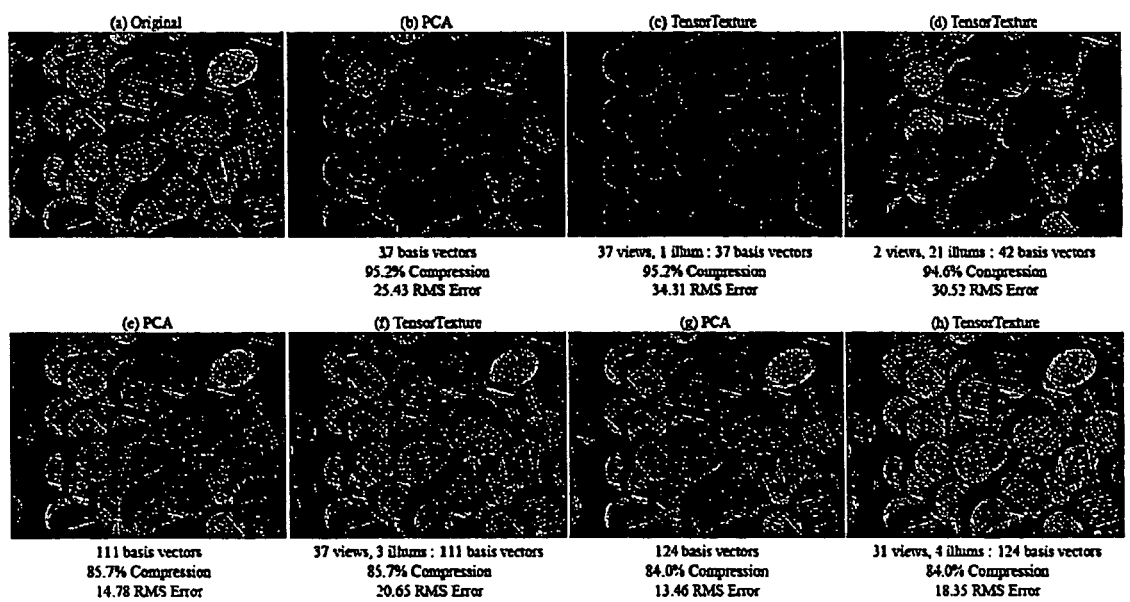
FIGS. 23(a)-23(h) are a comparison of TensorTexture image compression and PCA compression.

FIG. 23(a) depicts a comparison of TensorTexture exemplary image compression and PCA compression. Note in FIG. 23(c) that the 95.2% reduction of the illumination dimensionality suppresses illumination effects such as shadows and highlights, but that it does not substantially degrade the clarity of the texture, since the rank of the view mode matrix has not been reduced. However, a comparable compression using PCA results in the blurred texture of FIG. 23(b). Although the RMS error of the TensorTexture compression relative to the original image (FIG. 23(a)) is larger than the PCA compression, its perceptual error is smaller, yielding a substantially better image quality than comparable PCA compressions. FIG. 23(d) shows the degradation of the TensorTexture if we drastically compress in the view mode. Applying PCA compression in FIG. 23(e), the embodiment retains the 111 (out of 777) most dominant eigentextures. Applying TensorTextures exemplary technique, this exemplary embodiment may compress the dimensionality of the illumination mode from 21 to 3 ($R_{illum}$=3) in FIG. 23(f). Since $R_{view}$=37, the embodiment may retain 37×3 TensorTexture basis vectors, equaling the number of retained PCA basis vectors. The total number of coefficients representing the compressed images is 37+3. FIG. 23(d-e) illustrate the same scenario with 31×4 TensorTexture exemplary basis vectors.

The exemplary embodiment's TensorTextures basis (eq. (7) and FIG. 21) leads to a straightforward rendering algorithm, which is illustrated in FIG. 22. To render an image d, the embodiment may compute $$d = T \times_2 1^T \times_3 v^T \qquad (8)$$

where v and l are, respectively, the view and illumination representation vectors associated with the desired view and illumination directions. These will in general be novel directions, in the sense that they will differ from the observed directions associated with sample images in the ensemble. Given a novel view (illumination) direction, the embodiment first may find the three nearest observed view (illumination) directions which form a triangle on the view (illumination) hemisphere that contains this novel direction. The exemplary embodiment then may compute the novel view (illumination) representation vector v (1) as a convex combination, using homogeneous barycentric coordinates, of the view (illumination) representation vectors associated with the three observed view (illumination) directions. Note that this process is appropriate for a planar surface, since every texel of the rendered texture shares the same view/illumination representation. The computation (8) may be applied in the exemplary animation to render a TensorTexture of the coins on a planar surface in the chest under continuously varying view and illumination directions (as shown in FIG. 16).

FIG. 23 depicts the perceptual error incurred by compressing the illumination representation of the exemplary TensorTextures model. It should be noted this perceptual error is smaller than that of indiscriminate PCA compression in a subspace of comparable dimension. FIG. 23(a) depicts the original image. FIGS. 8(b)-8(h) depict exemplary PCA and TensorTexture compressions of image (a) using various numbers of basis vectors. The label above each image indicates the type of compression, while the annotations below indicate the basis set, the compression rate, and the root mean squared (RMS) error relative to the original image (a). For example, the PCA compression (e) retains 111 of the 777 most dominant eigentexture basis vectors, while the TensorTexture image compression (f) performed by the embodiment retains 111 TensorTextures bases associated with $\hat{U}_{view} \in IR^{37 \times 37}$ and $\hat{U}_{illum} \in IR^{21 \times 3}$, which reduces the illumination representation from 21 dimensions to 3 ($R_{illum}$=3). The RMS error of the PCA-compressed images are lower, as expected, yet comparable TensorTexture compressions generated by the embodiment have better perceptual quality.

Figure 24:
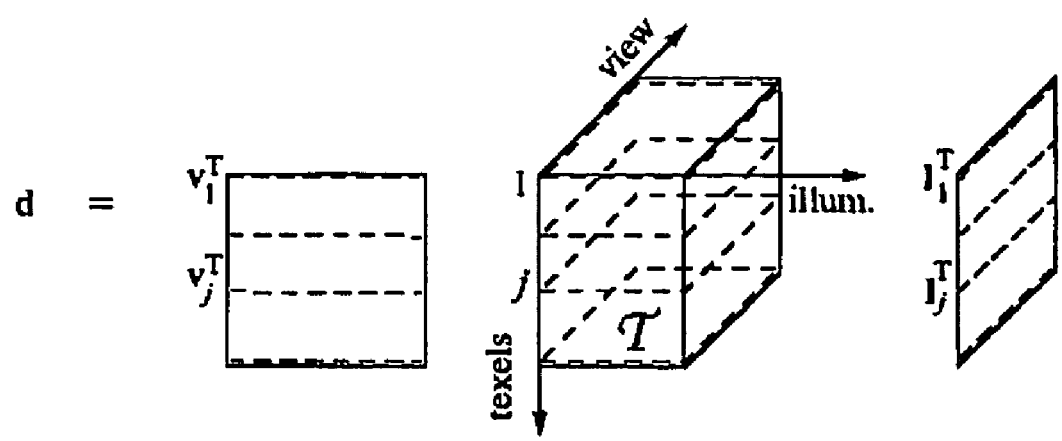
FIG. 24 is a TensorTexture rendering when every texel j has a different associated view $v_j$ and illumination $l_j$ direction.

When the embodiment renders a TensorTexture d on a curved surface, the view $v_j$ and illumination $l_j$ representation vectors associated with each texel j of d may be computed with respect to the given view and illumination directions as well as the direction of the surface normal at the center of texel j. The RGB value $d_j$ for texel j is then computed by the embodiment, as follows:

$$d_j = T_j \times_2 l_j^T \times_3 v_j^T, \quad (9)$$

where $T_j$ is a subtensor of the TensorTexture which governs the interaction between view and illumination for texel j (as shown in FIG. 24). FIG. 24 generally depicts a TensorTexture rendering when every texel j has a different associated view $v_j$ and illumination $l_j$ direction.

Figure 25:
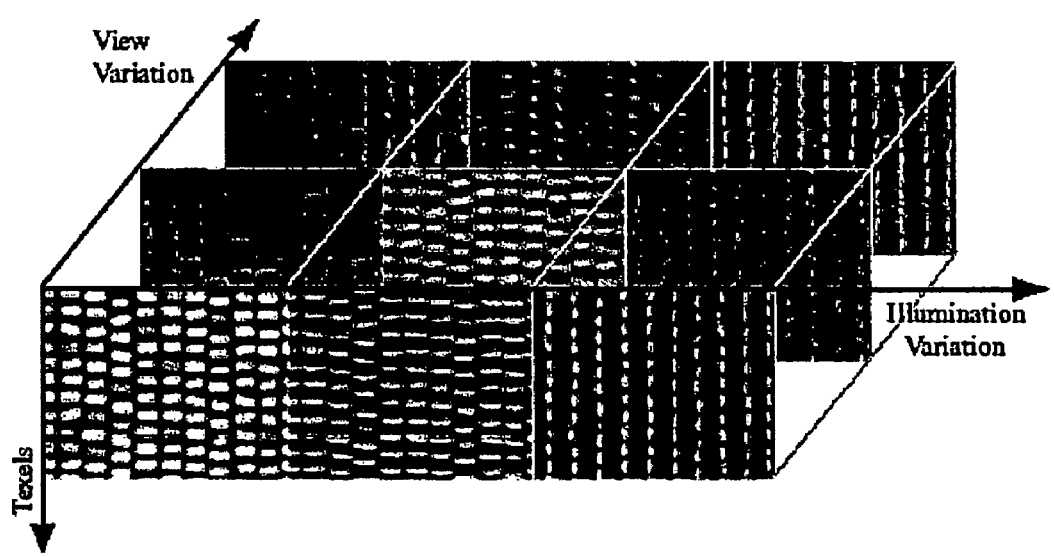
FIG. 25 is TensorTexture bases for a texture.
Figure 26:
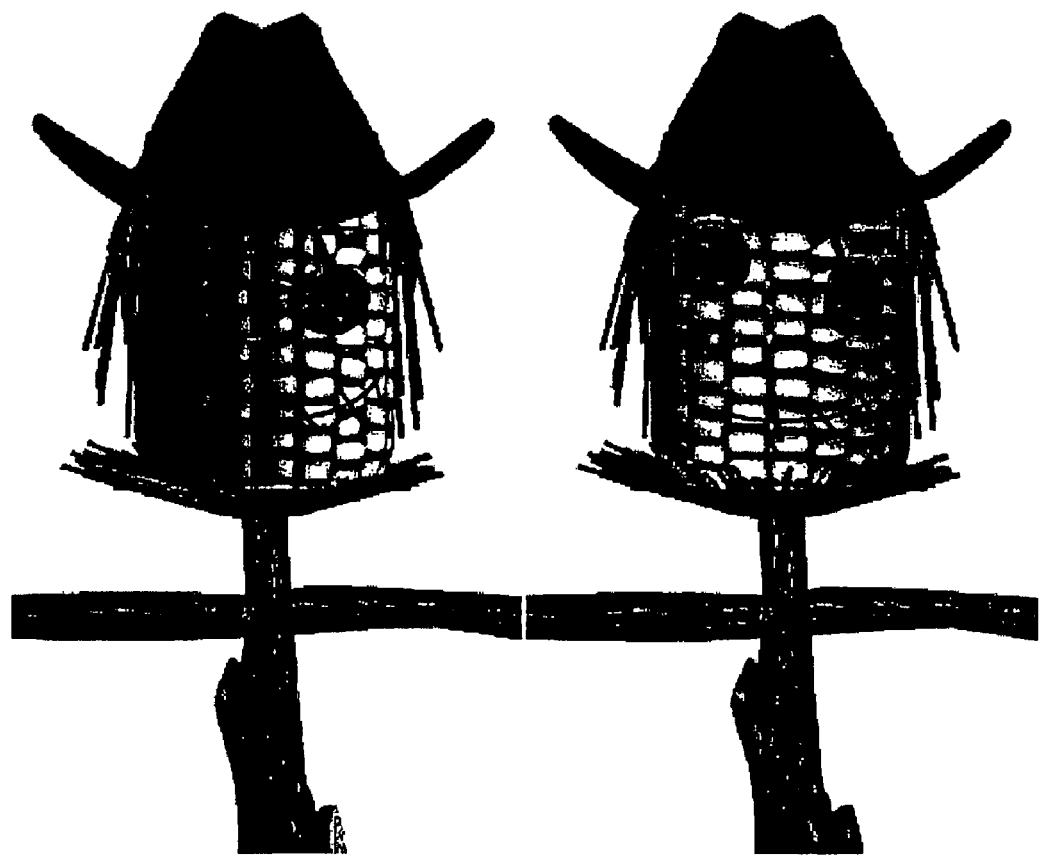
FIG. 26 is renderings, with different light source directions, of the texture of FIG. 25 mapped onto a cylinder.
Figure 27:
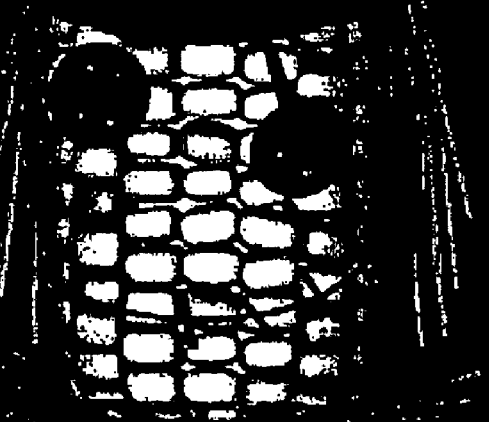
FIG. 27 is a still from an animation of the renderings of FIG. 26.

The exemplary embodiment may apply the TensorTextures exemplary operation to two synthetic image ensembles: the "coins" ensemble, which has served to illustrate the TensorTextures operation herein, and a "corn" image ensemble whose TensorTextures exemplary representation is illustrated in FIG. 25. FIG. 26 demonstrates the application by the embodiment of the computation of eq. (9) to render the corn TensorTexture onto a perfect cylinder that forms the head of a scarecrow, lit from two different directions. As the cylinder is rotated, the TensorTexture shows the desired three-dimensional effects, including self-occlusion and self-shadowing between the corn kernels. FIG. 27 shows the closing shot of an animated short in which the embodiment has employed a TensorTextured element (specifically, the scarecrow head).

Both of the synthetic image datasets in this example may be acquired by rendering three-dimensional graphics models of surfaces featuring considerable mesostructure. As in the case of the coins, the images of the corn surface may be also acquired by rendering the surface from 37 different view and 21 different illumination directions. In this example, both the coins and the corn TensorTexture exemplary models generated by this exemplary embodiment retain 37×11=407 TensorTexture basis vectors by reducing the illumination mode from 21 to 11, while retaining all of the basis vectors of the view mode in order to maintain the sharpness of the rendered images.

It may take considerable time to render each of the original sample images due to nontrivial scene geometries and rendering methods employed. After the embodiment computes a TensorTextures exemplary model offline, the online rendering of the TensorTextures is typically significantly more efficient. For the coins example, the rendering of the TensorTextured surfaces for arbitrary viewpoints and illuminations, took on average 1.6 seconds per image on the same workstation. Furthermore, because it is image-based, the TensorTextures online rendering speed is independent of the scene complexity.

Figure 28:
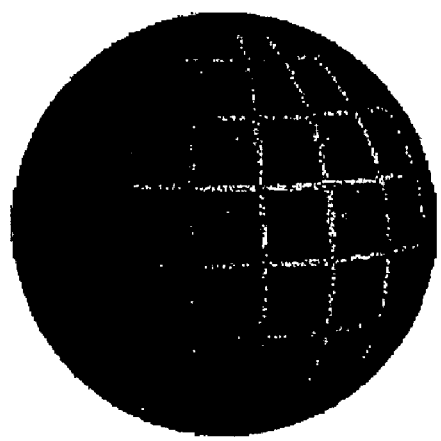
FIG. 28 is two examples of applying the TensorTextures operation to images of natural textured surfaces.
Figure 28:
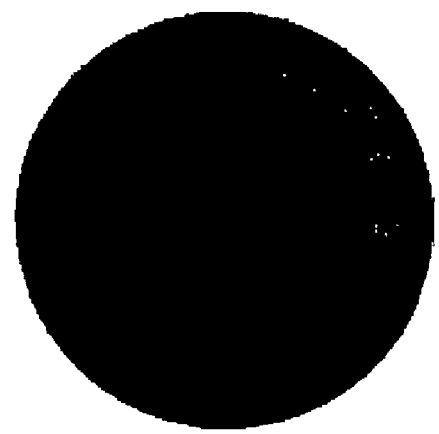
Figure 29:
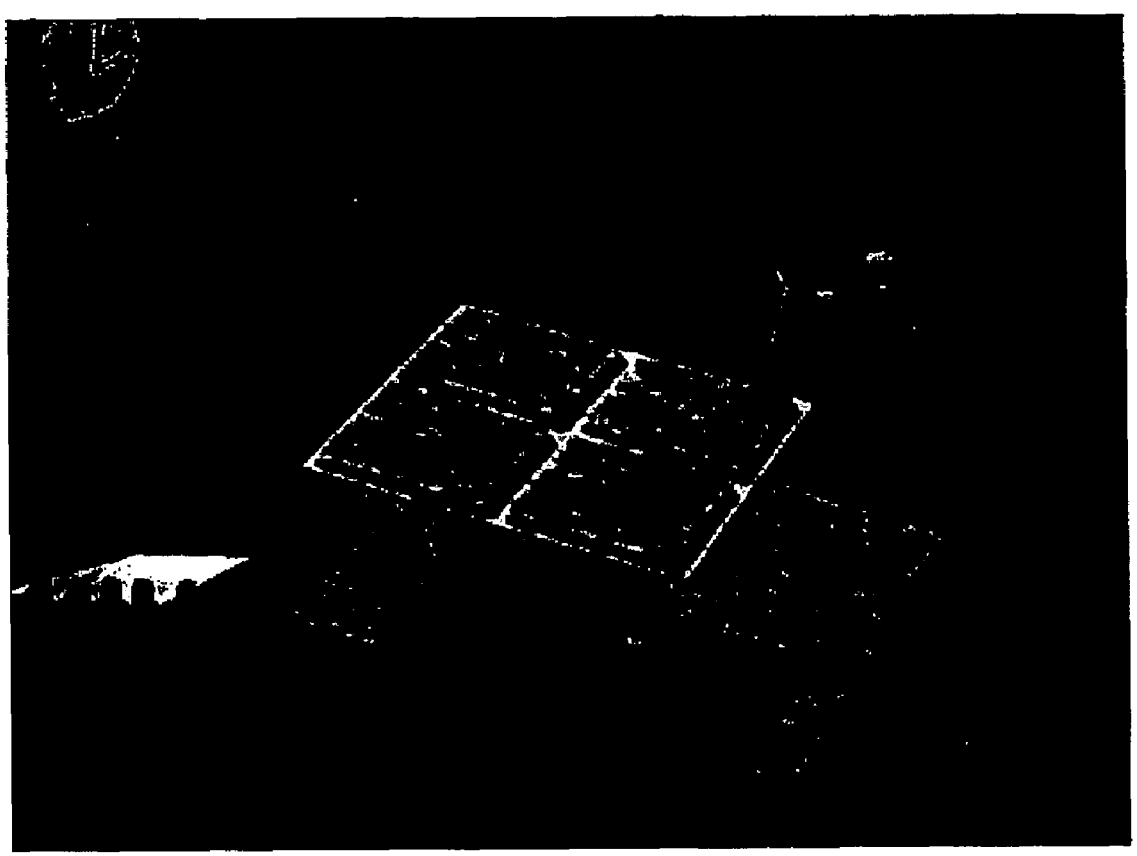
FIG. 29 is a segment of an animation mapping a TensorTexture onto a planar surface.

As yet another example, this exemplary embodiment may apply the TensorTextures exemplary operation to images of natural textured surfaces, such as those from the University of Bonn BTF database. FIG. 28 depicts two examples, namely a stone and corduroy TensorTexture, each mapped onto spheres using the rendering computation of eq. (9). The TensorTextures bases may be computed by the embodiment from ensembles of RGB sample images, each of size 256 rows×256 columns×3 channels, yielding 196608 texels acquired under 81 view and 81 illumination directions. The image data may be organized as 81×81×196608 tensors D. The view and illumination mode matrices may be computed in accordance with step 1 of the N-mode SVD computation, and their dimensionality may be reduced from 81 to 61 and from 81 to 27, respectively, yielding the reduced mode matrices $\hat{U}_{view} \in IR^{81\times 61}$ and $\hat{U}_{illum} \in IR^{81\times 27}$. The 61×27 TensorTextures bases vectors may be computed by the embodiment according to equation (7). As a final demonstration, a Flintstone Phonograph animation mapping a TensorTexture on the planar "turntable" surface may be created by an exemplary embodiment, and is shown in FIG. 29. Image compression may be obtained by retaining 61×27 TensorTextures basis associated with $\hat{U}_{view} \in IR^{81\times 61}$ and $\hat{UI}_{illum} \in IR^{81\times 27}$, which reduces the viewpoint representation from 81 dimensions to 61 ($R_{view}$=61) and the illumination representation from 81 dimensions to 27 ($R_{illum}$=27)

The embodiment may employ a multilinear approach to image-based rendering of textured surfaces. The TensorTextures operation may provide a parsimonious, explicitly multifactor approximation to the bidirectional texture function (BTF). Further, the TensorTextures operation may produce a TensorTexture, computed through a tensor decomposition known as the N-mode SVD, which is a natural extension to tensors of the conventional matrix singular value decomposition (SVD). The embodiment may operate on both synthetic and natural texture image ensembles.

This exemplary embodiment may generally handle data sets that result from the variation of additional factors, such as BTF scale (i.e., zooming into or away from a textured surface), high dynamic range (HDR) BTF acquisition at multiple exposures, or temporally varying BTFs, such as aging skin or leaves changing colors in the fall. Alternative exemplary embodiments may incorporate a variant of view-dependent displacement maps.

While the invention has been described in connecting with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What is claimed:

1. A storage medium storing a software program that is adapted for generating an object descriptor of at least one object, wherein the software program, when executed by a processing arrangement, is configured to cause the processing arrangement to execute the operations comprising:

collecting a plurality of first data elements which contain information regarding at least one characteristic of the at least one object;

obtaining the object descriptor based on the information of the first data elements, wherein the object descriptor is related to the at least one characteristic and a further characteristic of the at least one object; and generating a plurality of second data elements which contain information regarding the further characteristic of the at least one object based on the object descriptor, wherein each of the second data elements is one of an identity of an object, a viewpoint, an illumination, or a pixel.

2. The storage medium of claim 1, wherein the operations further comprise generating an image associated with the second data elements.

3. The storage medium of claim 2, wherein the operation of generating an image associated with the second data elements comprises applying a texture to a surface, the texture being associated with the plurality of second data elements.

4. The storage medium of claim 3, wherein the operations further comprise updating the texture to account for one of a motion of the surface or a motion of a viewpoint.

5. The storage medium of claim 1, wherein the at least one characteristic of the at least one object is at least one of a viewpoint, an illumination, or a pixel.

6. The storage medium of claim 1, wherein the first data elements are defined by at least two primitives.

7. The storage medium of claim 5, wherein the primitives include at least one of an identity of an object, a viewpoint, an illumination, or a pixel.

8. The storage medium of claim 6, wherein the first data elements form a tensor organized based on the primitives.

9. The storage medium of claim 1, wherein the second data elements are defined by at least two primitives.

10. The storage medium of claim 1, wherein the object descriptor is obtained using an n-mode orthonormal decomposition procedure.

11. A storage medium including a software program for identifying a sample object based upon a sample object descriptor, wherein the software program, when executed by a processing arrangement, is configured to cause the processing arrangement to execute the operations comprising:
    collecting a plurality of data elements which are defined by at least two primitives;
    obtaining at least one of a plurality of object descriptors based on the information of the data elements; and
    comparing the sample object descriptor to at least one of the object descriptors for determining whether the sample object descriptor is identifiable as one of the object descriptors, wherein each of the object descriptors is associated with a respective one of a plurality of objects, wherein the sample object is one of an identity of an object, a viewpoint, an illumination, and a pixel.

12. The storage medium of claim 11, wherein the first primitives include at least one of an identity of an object, a viewpoint, an illumination, and a pixel.

13. The storage medium of claim 11, wherein the second primitives include at least one of an identity of an object, a viewpoint, an illumination, and a pixel.

14. The storage medium of claim 11, wherein the first data elements form a tensor organized based on the first primitives.

15. The storage medium of claim 11, wherein the second data elements form a tensor organized based on the second primitives.

16. The storage medium of claim 11, wherein each of the object descriptors and the sample object descriptor are obtained using an n-mode single value decomposition procedure.

17. The storage medium of claim 11, wherein a magnitude of the sample object descriptor is compared to respective magnitudes of the object descriptors to determine whether the sample object is potentially identifiable as one of the objects.

18. A storage medium storing a software program that is adapted for generating an object descriptor, wherein the software program, when executed by a processing arrangement, is configured to cause the processing arrangement to execute the operations comprising:
    collecting a plurality of data elements which are defined by at least two primitives; and
    obtaining the object descriptor based on the information of the data elements using an n-mode orthonormal decomposition process.

19. The storage medium of claim 18, wherein the object descriptor is one of an identity of an object, a viewpoint, an illumination, or a pixel.

20. The storage medium of claim 18, wherein the n-mode orthonormal decomposition procedure is an n-mode singular value decomposition procedure.

21. The storage medium of claim 20, wherein the n-mode singular value decomposition procedure is capable of decomposing the tensor into a core tensor and at least two orthonormal matrices.

22. The storage medium of claim 18, wherein the object descriptor is a texture of an object.

23. A storage medium storing a software program for reducing a dimensionality of one of at least two object descriptors, wherein the software program, when executed by a processing arrangement, is configured to cause the processing arrangement to execute the operations comprising:
    collecting a plurality of data elements which are defined by at least two primitives;
    obtaining the one of the object descriptors based on the information of the data elements; and
    reducing the dimensionality of the one of the object descriptors, wherein the one of the object descriptors is one of an identity of an object, a viewpoint, an illumination, and a pixel.

24. The storage medium of claim 23, wherein each of the object descriptors except for the one of the object descriptors having the reduced dimensionality maintain full dimensionality.

25. The storage medium of claim 23, wherein the data elements form a tensor organized based on the primitives.

26. The storage medium of claim 23, wherein the one of the at least two object descriptors is obtained using an n-mode single value decomposition procedure.

27. The storage medium of claim 23, wherein the dimensionality of the one of the object descriptors is reduced using an n-mode orthogonal iteration procedure.

* * * * *